(12) United States Patent
Sedlmeier et al.

(10) Patent No.: US 12,330,707 B2
(45) Date of Patent: Jun. 17, 2025

(54) ADJUSTMENT DEVICE FOR STEERING COLUMNS OF VEHICLES

(71) Applicant: Willi Elbe Gelenkwellen GmbH & Co. KG, Tamm (DE)

(72) Inventors: Ralf Sedlmeier, Pleidelsheim (DE); Jörg Hauhoff, Altdorf (DE); Thomas Herrlich, Putzbrunn (DE); Aleksandar Antonov, Izbeglii (BG)

(73) Assignee: Willi Elbe Gelenkwellen GmbH & Co. KG, Tamm (DE)

( * ) Notice: Subject to any disclaimer, the term of this patent is extended or adjusted under 35 U.S.C. 154(b) by 0 days.

(21) Appl. No.: 18/626,369

(22) Filed: Apr. 4, 2024

(65) Prior Publication Data
US 2024/0336295 A1   Oct. 10, 2024

(30) Foreign Application Priority Data
Apr. 6, 2023  (DE) .......................... 102023001452.4

(51) Int. Cl.
*B62D 1/187*  (2006.01)
*B62D 1/181*  (2006.01)

(52) U.S. Cl.
CPC ............. *B62D 1/187* (2013.01); *B62D 1/181* (2013.01)

(58) Field of Classification Search
CPC ................................ B62D 1/187; B62D 1/181
USPC ................................................... 74/492, 493
See application file for complete search history.

(56) References Cited

U.S. PATENT DOCUMENTS

| 9,783,222 | B2 * | 10/2017 | Tomiyama | B62D 1/184 |
|---|---|---|---|---|
| 11,511,789 | B2 * | 11/2022 | Geiselberger | B62D 1/181 |
| 11,697,446 | B2 * | 7/2023 | Schacht | B62D 1/181 |
| | | | | 74/493 |
| 2004/0144192 | A1 | 7/2004 | Tomaru et al. | |
| 2017/0240199 | A1 * | 8/2017 | Nagatani | B62D 1/195 |
| 2021/0237791 | A1 * | 8/2021 | Geiselberger | B62D 1/195 |
| 2021/0309282 | A1 | 10/2021 | Rist et al. | |
| 2021/0362768 | A1 * | 11/2021 | Huber | F16H 25/2015 |
| 2023/0373554 | A1 * | 11/2023 | Huber | B62D 1/195 |
| 2024/0239399 | A1 * | 7/2024 | Hauhoff | B62D 1/192 |

FOREIGN PATENT DOCUMENTS

| CN | 115743285 A | 3/2023 |
|---|---|---|
| DE | 102014101995 A1 | 1/2015 |
| DE | 102018213679 A1 | 2/2020 |
| JP | 2019104368 A | 6/2019 |

* cited by examiner

*Primary Examiner* — Toan C To
(74) *Attorney, Agent, or Firm* — Smartpat PLC

(57) ABSTRACT

A compact adjustment device for steering columns of vehicles has a length-adjustable steering shaft to which a steering element can be connected. It includes at least one drive unit for length adjustment of the steering shaft. The steering shaft has a guide tube which is non-displaceably connected to a holder and into which an axially displaceable inner tube projects. It is drive-connected to the drive unit and can be connected to the steering element. Only a single drive unit is required to adjust the length of the steering shaft. It is used to axially move the inner tube to change the length of the steering shaft. The steering element is attached to the inner tube and can then be adjusted to the most favorable driving position using the inner tube. Since only one drive unit is required for the length adjustment, the design effort of the adjustment device is limited.

15 Claims, 39 Drawing Sheets

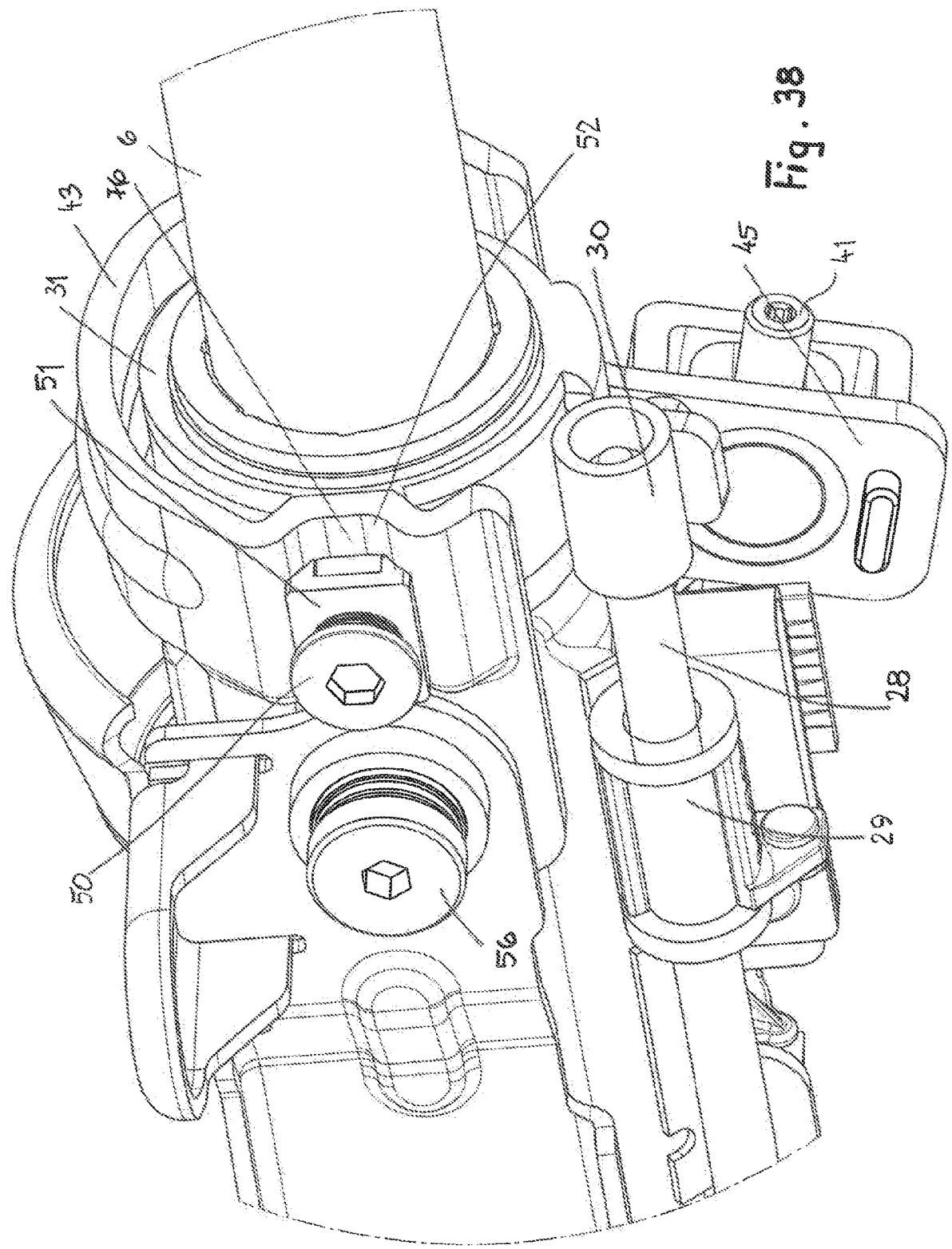

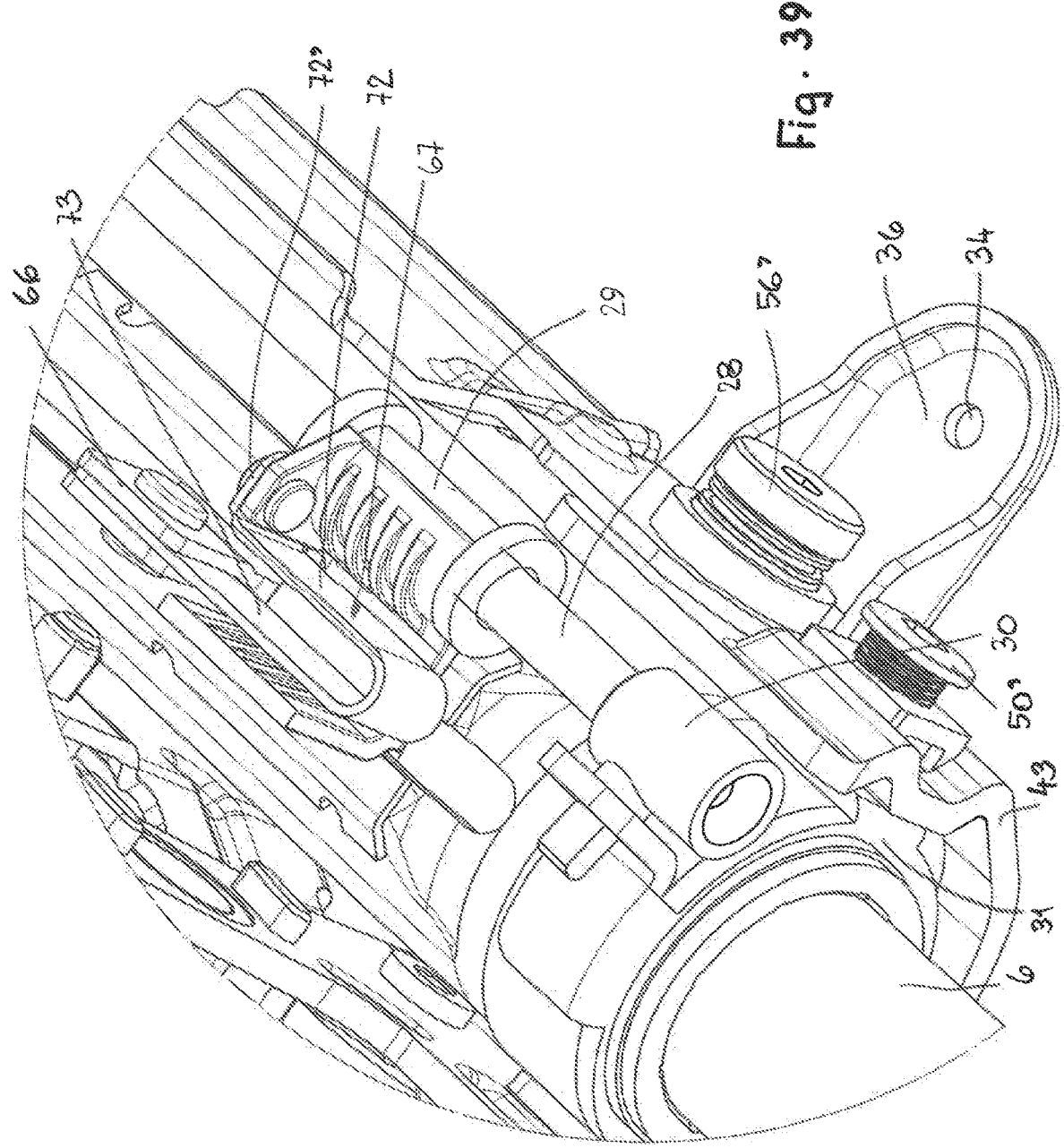

ADJUSTMENT DEVICE FOR STEERING COLUMNS OF VEHICLES

CROSS-REFERENCE TO RELATED APPLICATION

This application claims the benefit of German Patent Application DE 10 2023 001 452.4, filed on Apr. 6, 2023, the contents of which is incorporated in its entirety.

TECHNICAL FIELD

The disclosure relates to an adjustment device for steering columns of vehicles.

BACKGROUND

An adjustment device serves to adapt the steering element, for example a steering wheel, of a vehicle to the driver's seating position. The steering shaft of the adjustment device is adjustable at least in its length. Increasingly stricter requirements are being placed on such adjustment devices in terms of size, particularly in view of the fact that the installation space for such adjustment devices, particularly in electric vehicles, is often only small. Such adjustment devices should be inexpensive to produce without affecting the functionality of the adjustment devices.

SUMMARY

The disclosure provides an adjustment device that, despite being inexpensive to manufacture, requires only a small installation space without impairing functionality.

This is achieved according to the invention by the subject matter as claimed.

The adjustment device is designed in such a way that only a single drive unit is required to adjust the length of a steering shaft. It is used to axially move an inner tube in order to change the length of the steering shaft. A steering element is attached to the inner tube and can then be adjusted to the most favorable driving position using the inner tube. Since only one drive unit is required for the length adjustment, the design effort of the adjustment device is limited.

In addition, the adjustment device requires a correspondingly small installation space, so that the adjustment device is compact and can also be used in tight installation spaces.

A particularly simple and space-saving design results when a guide tube-within which the inner tube is slidably mounted-features an axially extending slot. A driver that is firmly attached to the inner tube and allows for the connection of the drive unit protrudes through this slot. During the axial adjustment of the inner tube, the driver is moved along the slot in the guide tube.

A cost-effective design that only requires a small amount of space is achieved when a threaded spindle drive is used as the drive unit. A drive nut sits on its threaded spindle and is advantageously firmly connected to the driver of the inner tube. By turning the threaded spindle, the drive nut is displaced depending on the direction of rotation of the threaded spindle, whereby the inner tube is correspondingly axially displaced via the driver connected to the drive nut.

In a further embodiment, the steering shaft can be pivoted about a pivot axis, via which the steering shaft is connected to a holder. By pivoting about this pivot axis, the steering shaft's height can be adjusted, allowing for the steering element to be positioned at various heights. At a distance from this pivot axis, the inner tube is connected to a lifting element, on which an adjusting element is mounted so as to be pivotable about a further axis. This further axis is parallel to the pivot axis of the steering shaft. The steering shaft can thus be pivoted about its pivot axis in the desired direction by the adjusting element.

The adjusting element is drive-connected to a corresponding height adjustment drive, by which the adjusting element can be pivoted in the desired direction. The height adjustment drive can be easily attached to the holder of the adjustment device.

The adjusting element is advantageously mounted on the holder so that it can pivot about a pivot axis, about which the adjusting element pivots when adjusting the height of the steering shaft.

The pivot axis of the adjusting element is advantageously parallel to the further pivot axis of the lifting element.

In order to enable a simple, space-saving design, the adjusting element is provided with a protruding lever arm which runs transversely to its pivot axis and on which the height adjustment drive acts. The lever arm can be provided in such a way that it can be arranged, for example, immediately adjacent to the holder of the steering shaft.

A compact design is advantageously achieved when the adjusting element partially surrounds the lifting element.

The adjusting element is preferably provided with at least one sliding guide, into which at least one sliding piece assigned to the lifting element engages. When adjusting the height of the steering shaft, the adjusting element is pivoted about its pivot axis, with the adjusting element being pivoted relative to the lifting element at the same time via the further axis. The sliding guide and the sliding piece then ensure that the sliding piece can slide to the required extent in the sliding guide of the adjusting element during the pivoting process of the adjusting element.

The sliding guide advantageously runs perpendicular to the pivot axis of the adjusting element.

Since the adjusting element is pivoted relative to the lifting element when adjusting the height of the steering shaft, the spatial position of the sliding guide also changes. In order for the sliding piece of the lifting element to follow the change in position of the sliding guide, it is advantageously arranged to be rotatable about an axis parallel to the pivot axis.

Such a height adjustment is advantageously ensured if the adjusting element is provided with diametrically opposed sliding guides into which sliding pieces of the lifting element engage, in particular if the adjusting element at least partially surrounds the lifting element. Guiding the adjusting element on two diametrically opposite sides ensures that the adjusting element can be pivoted reliably relative to the lifting element.

Advantageously, the distance between the pivot axis of the adjusting element and the further axis of the lifting element is smaller than the distance of the pivot axis of the steering shaft from the further axis and/or the pivot axis of the adjusting element.

The sliding guide and the sliding piece allow axial compensation during the pivoting of the steering shaft during its height adjustment.

The main force is introduced in the pivot axis of the steering shaft. The axial compensation is achieved by different radii in the further axis of the lifting element. This makes it possible to manage the high loads due to the long lever lengths. They come about because the pivot axis of the steering shaft and the pivot axis of the adjusting element/the further axis of the lifting element are at a large distance from one another. Advantageously, the mentioned axes are located at different end regions of the holder.

A compact design is achieved when the height adjustment drive is a threaded spindle drive, on the threaded spindle of which a drive nut is seated, on which the adjusting element is pivotably mounted. During the pivoting movement, the adjusting element on the drive nut can pivot accordingly.

The invention is explained in more detail below with reference to an exemplary embodiment illustrated in the drawings.

BRIEF DESCRIPTION OF THE DRAWINGS

FIG. 38 shows the adjustment lever according to FIG. 37 in another perspective representation.

FIG. 39 shows an enlarged view of a crash device of the steering column adjustment device.

DETAILED DESCRIPTION

The electric steering column adjustment device has a high stiffness and is designed to be compact. It can so be installed particularly in installation spaces with limited volume. The adjustment device is particularly suitable for semi-autonomous driving with a vehicle in which the steering is not passed on mechanically to the steerable vehicle wheels by means of a steering element, such as a steering wheel, but is carried out electrically.

Figure 30:
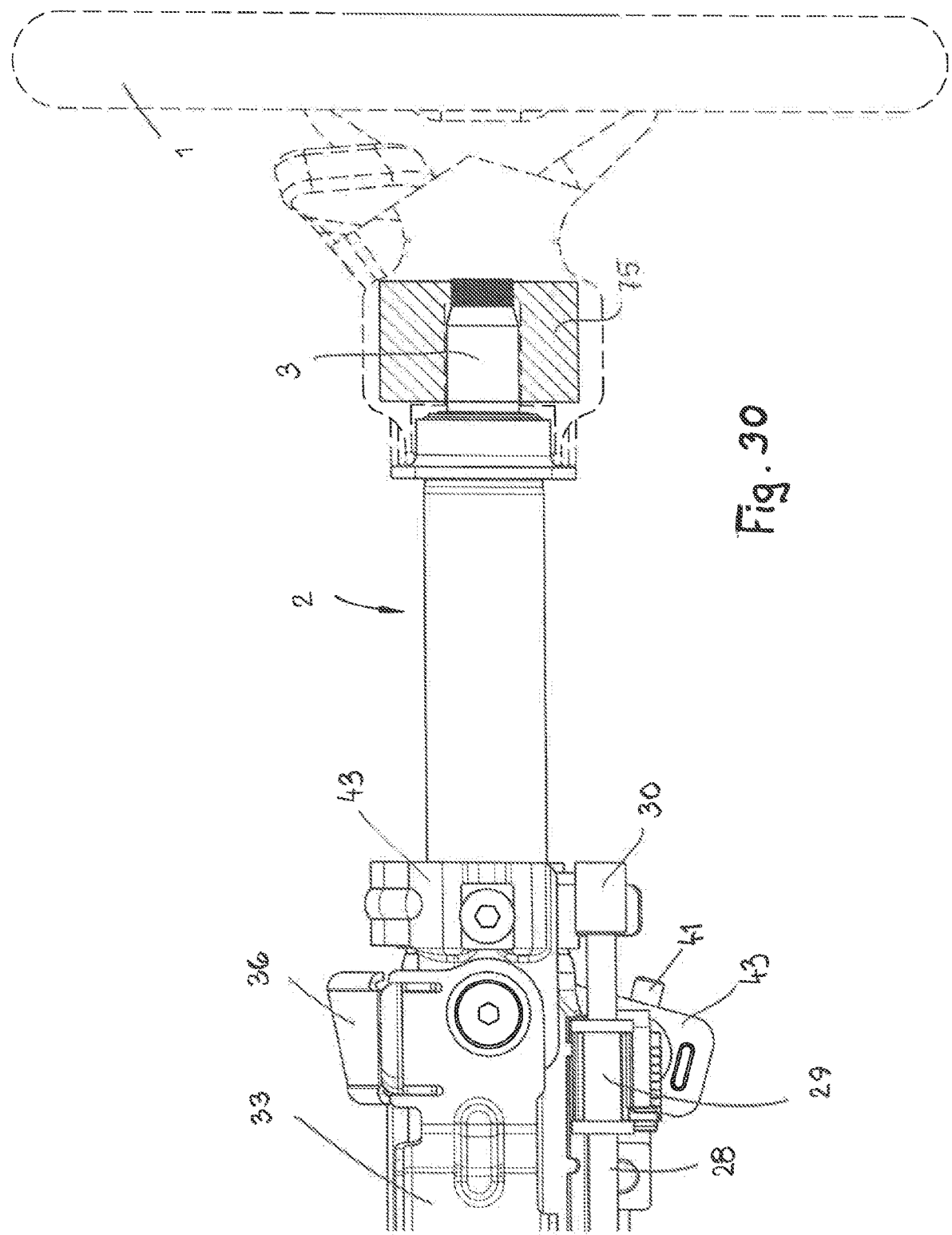
FIG. 30 is a simplified representation of the arrangement of a sensor near a steering wheel.

The adjustment device has a steering element 1, which is secured for corotation on a steering shaft 2 (FIG. 30). The steering element 1 is advantageously a steering wheel but can also have any other suitable design. The adjustment device is designed so that the steering element 1 can be adjusted to adapt to the position of the driver both in the longitudinal direction of the steering shaft 2 and transversely to it in the height direction.

The steering shaft 2 has a steering spindle 3, on the free end of which the steering element 1 is fastened in a known manner. The steering spindle can be moved in its longitudinal direction in order to adjust the steering element 1 into different longitudinal positions.

In order to give the driver the feeling of direct steering of the vehicle wheels despite the electrical adjustment of the steerable vehicle wheels, the adjustment device is provided with an actuator 4. The actuator 4 generates a counter-torque when the steering shaft 2 is rotated by means of the steering element 1. This gives the driver the impression that he is steering the wheels of the vehicle mechanically.

Figure 6:
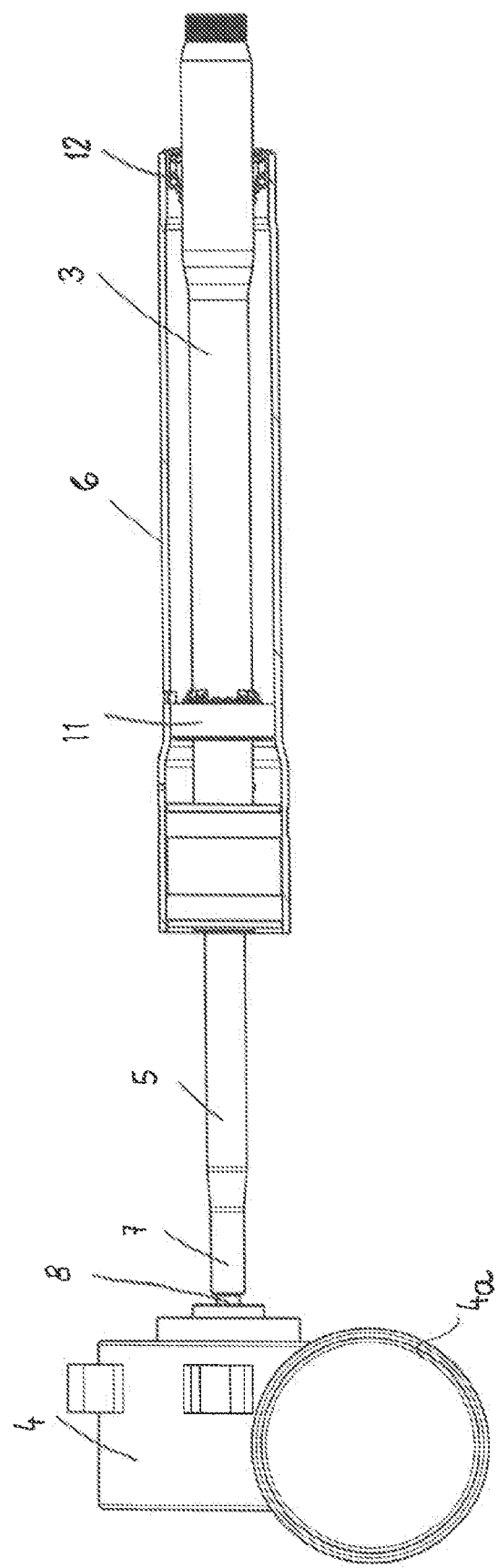
FIG. 6 shows a side view of an inner steering shaft of the steering column adjustment device.

The actuator 4 has a drive unit 4a, the axis of which runs perpendicular to the axis of the actuator 4 and which rotatably drives a toothed shaft 5, which projects into a casing tube 6 (FIG. 6).

FIG. 6 shows the inner steering shaft of the adjustment device. The toothed shaft 5 is connected to a shaft 8 of the actuator 4 in a rotationally fixed manner via a coupling 7. The toothed shaft 5 and the steering spindle 3 are connected to one another in a rotationally fixed manner but can be moved axially relative to one another.

Figure 7:
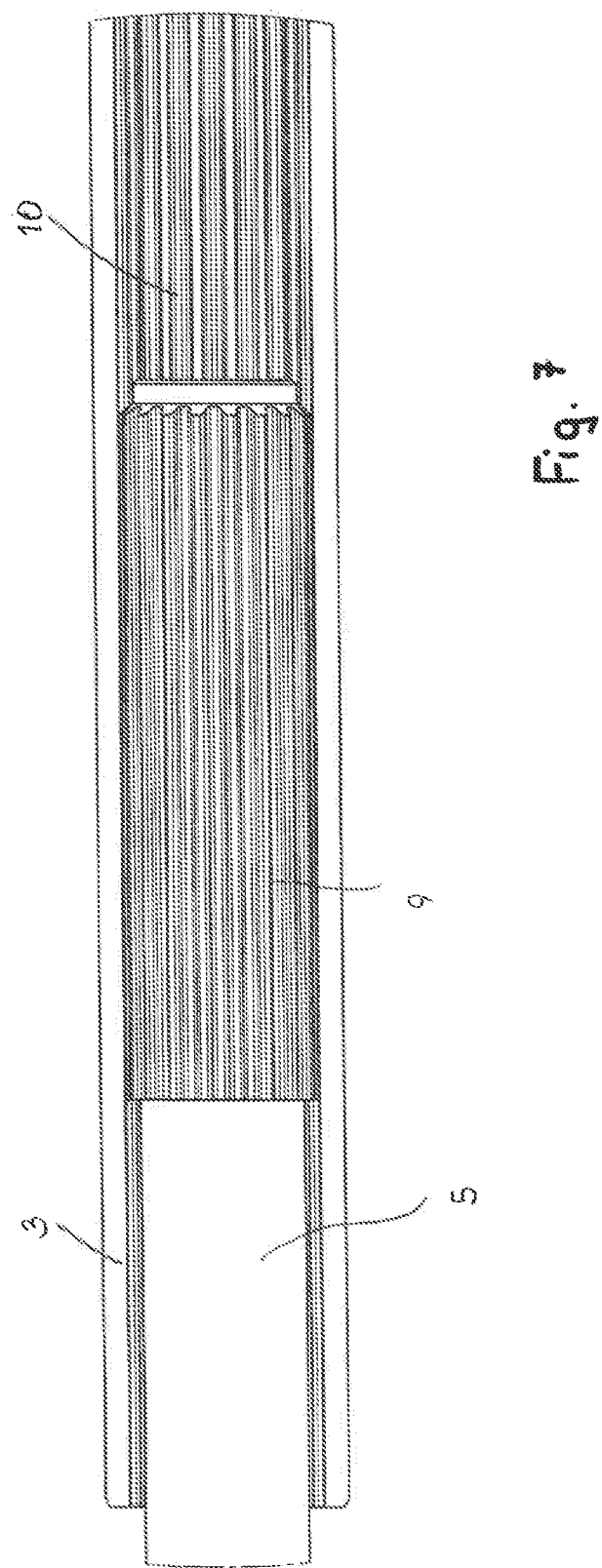
FIG. 7 shows a sliding spine connection of the inner steering shaft according to FIG. 6.

FIG. 7 shows this telescopic rotationally fixed connection between the toothed shaft 5 and the steering spindle 3. The toothed shaft 5 has an axial outer toothing 9 extending over a part of its length, which engages a corresponding inner toothing 10 of the steering spindle 3. The two interlocking toothings 9, 10 form a sliding spine connection which enables the steering spindle 3 to be displaced axially relative to the toothed shaft 5. Rotation of the steering spindle 3 relative to the toothed shaft 5 is not possible because of the toothings 9, 10.

Within the casing tube 6, the steering spindle 3 is rotatably supported by rotary bearings 11, 12 (FIG. 6). The rotary bearing 11 is located near the end of the casing tube 6 facing the actuator 4, while the rotary bearing 12 is provided at the other end of the casing tube 6. The arrangement and the number of rotary bearings 11, 12 are, of course, only to be understood as examples.

The casing tube 6 projects into a guide tube 13 (FIG. 8), which is attached to a housing 14 of the actuator 4.

The guide tube 13 surrounds the casing tube 6 at a distance and is axially displaceable relative to the guide tube 13.

Figure 8:
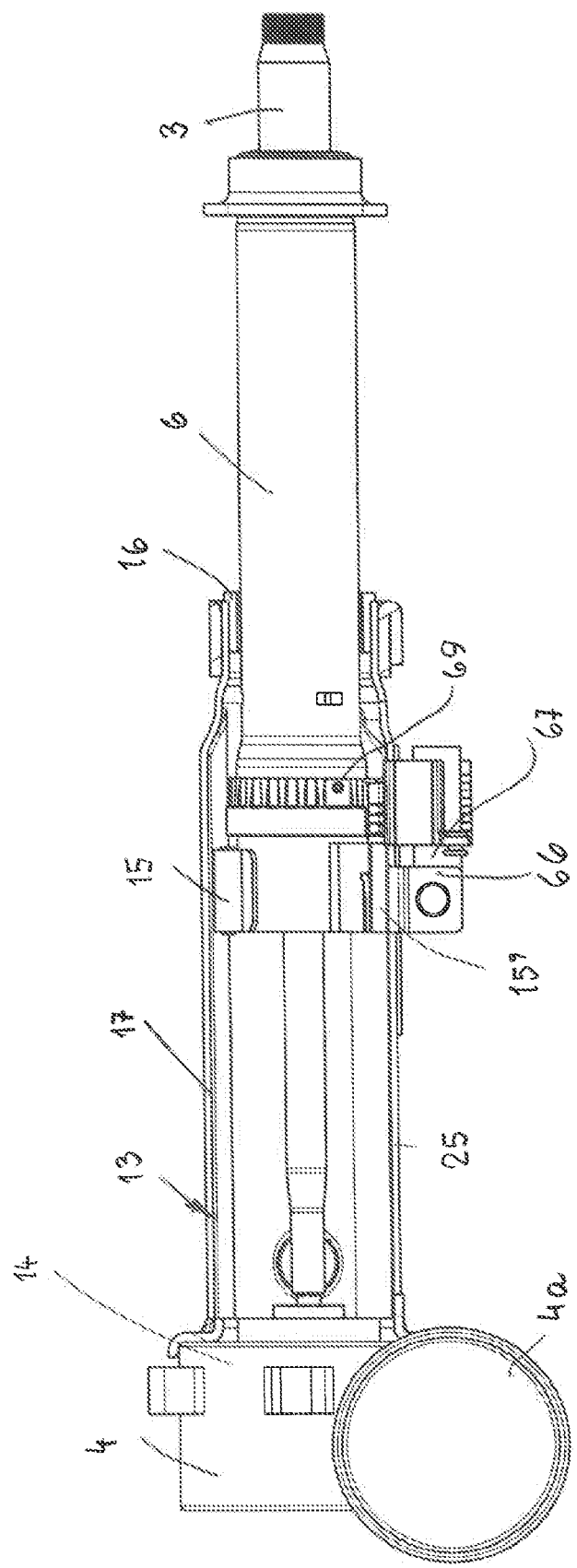
FIG. 8 shows the steering column adjustment device in the driving position.
Figure 9:
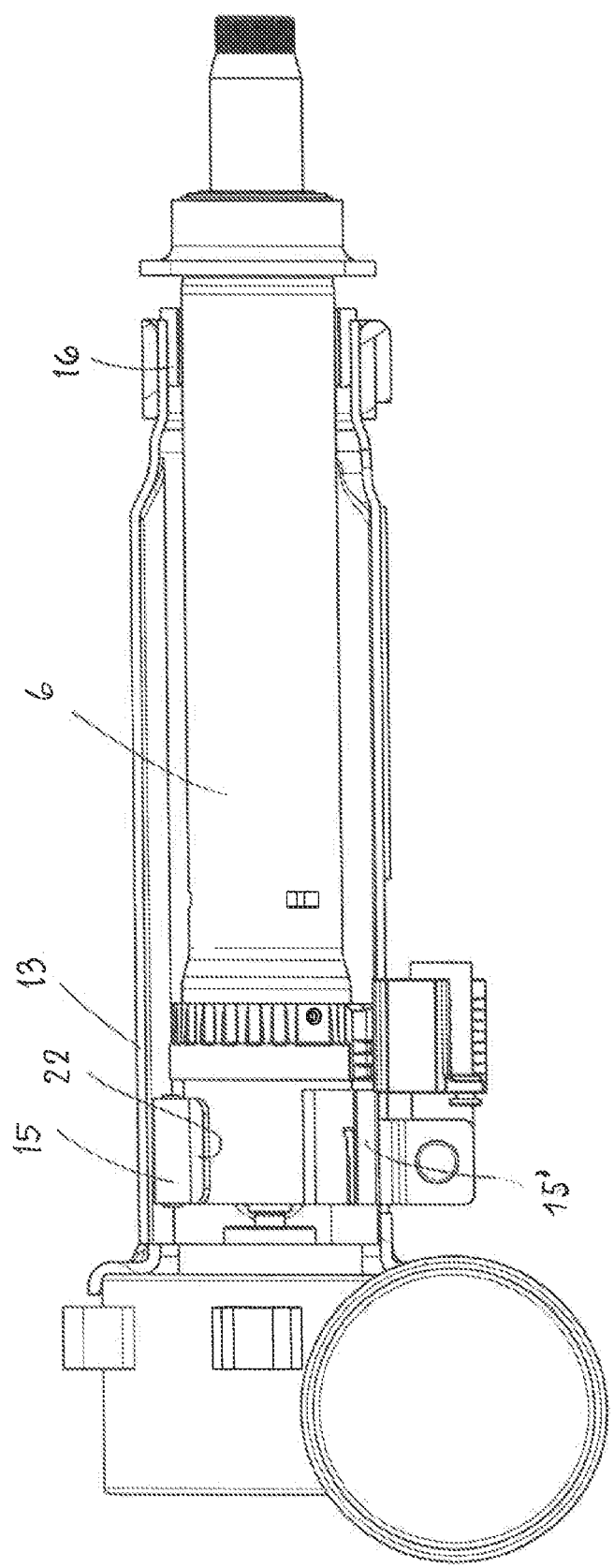
FIG. 9 shows the steering column adjustment device in the stowed position.
Figure 10:
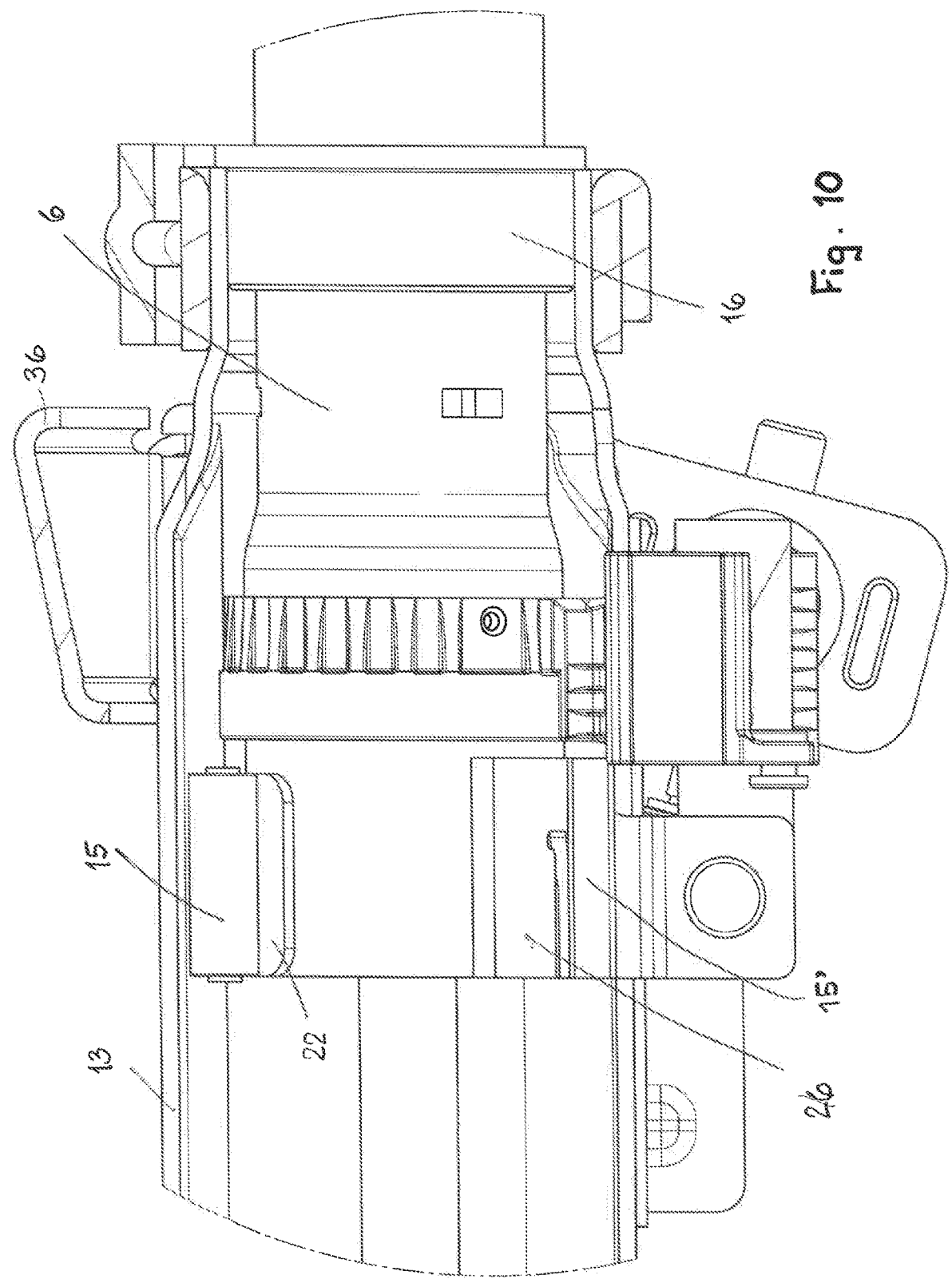
FIG. 10 shows an enlarged view of the end of a guide tube on the steering spindle side, into which a casing tube engages, through which a steering spindle of the steering column adjustment device extends.

In the position according to FIG. 8, the casing tube 6 has been moved out of the guide tube 13 as far as possible. FIG. 9 shows the retracted position of the casing tube 6. In the position according to FIG. 8, the steering element 1 is in its driving position, while in the position according to FIG. 9 the steering wheel assumes its stowed position.

Guide elements 15, 15', 16 are provided for guiding the casing tube 6 in the guide tube 13. The guide elements 15, 15' are arranged on the outside of the casing tube 6 and the guide element 16 is arranged on the inside of the guide tube 13. The guide elements 15, 15' are arranged at the end of the casing tube 6 that is located inside the guide tube 13, while the guide element 16 is fastened to the free end of the guide tube 13.

Figure 11:
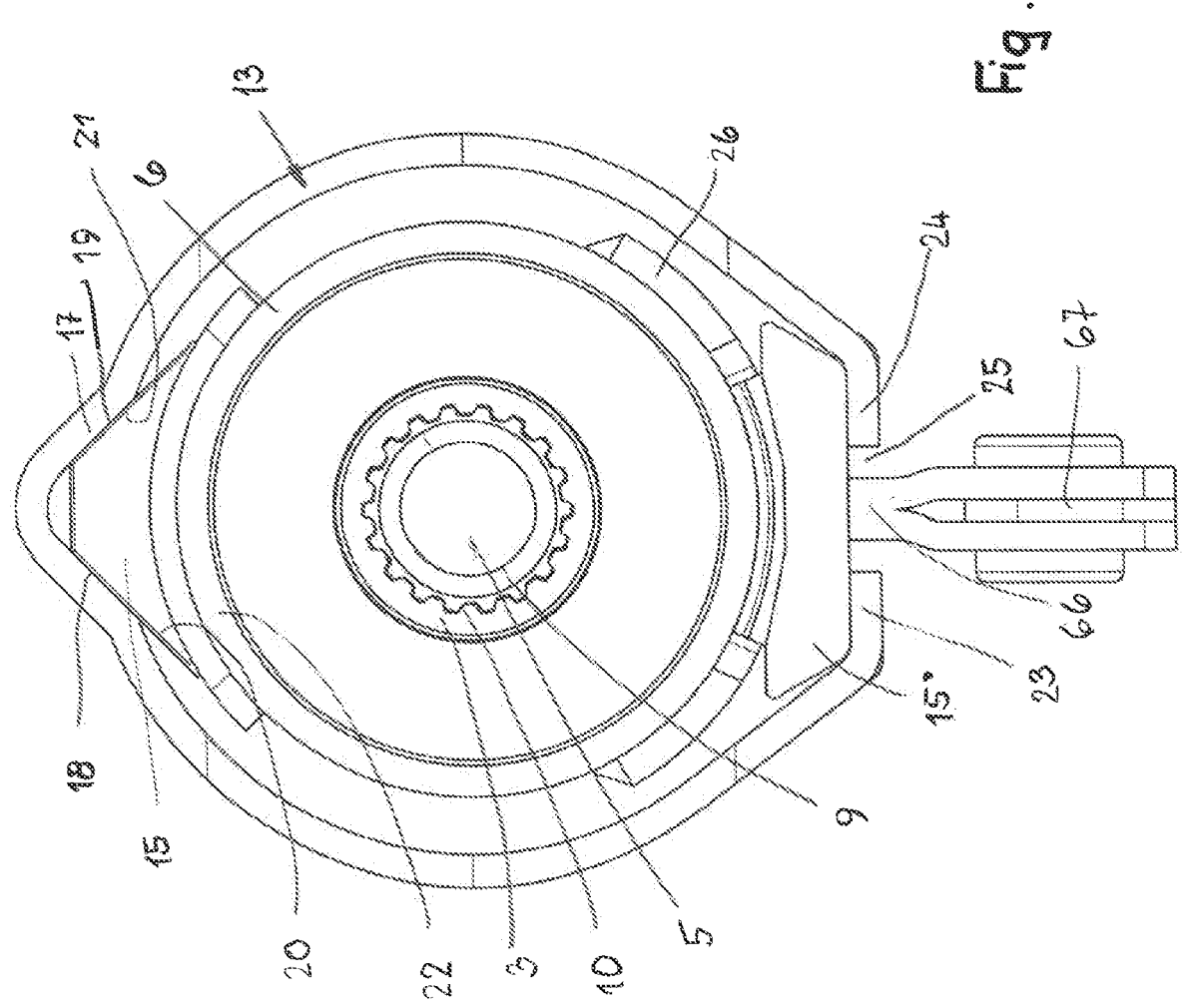
FIG. 11 shows an end view of the guide tube with casing tube and steering spindle according to FIG. 10.

As FIG. 11 shows, the guide tube 13 is provided with an upper bulge 17, which is formed by a corresponding plastically deformed region of the jacket of the guide tube 13. The bulge 17 extends at least over the maximum displacement path of the casing tube 6. According to FIG. 8, the bulge 17 extends close to the housing 14 of the actuator 4 and is at an axial distance from the free end of the guide tube 13.

The bulge 17 has two side walls 18, 19, which serve as sliding surfaces for the upper guide element 15 of the casing tube 6 and against which the guide element 15 rests flat with corresponding side walls 20, 21. As a result, the casing tube 6 is perfectly guided in the guide tube 13 during the displacement process.

As FIG. 11 shows, the guide element 15 has a prismatic cross section and is fastened in a suitable manner to the casing tube 6. In the exemplary embodiment, the prismatic guide element 15 rests on a curved flat fastening part 22, which is firmly connected to the outside of the casing tube 6.

The guide element 15 and the fastening part 22 extend over a sufficient axial length of the casing tube 6, so that it can be reliably guided in the region of its end located inside the guide tube 13.

The lower guide element 15' is diametrically opposite the guide element 15. It is also designed, for example, as prismatic (FIG. 11) and rests on two edge sections 23, 24 of the guide tube 13 which are spaced apart from one another. They are part of a flattened wall section of the guide tube 13, in which there is an axially extending slot 25, which is laterally delimited by the edge sections 23, 24. Like the bulge 17, the slot 25 is so long that the casing tube 6 can execute its maximum displacement path relative to the guide tube 13. The lower guide element 15' is in turn fastened in a suitable manner to the outer wall of the casing tube 6.

The two edge sections 23, 24 of the guide tube 13 lie opposite each other at the same height and are spaced apart and are arranged so that their support surfaces for the guide element 16 are also at the same height.

A simple fastening of the guide element 15' to the casing tube 6 is possible if, as shown in FIG. 11, a curved flat fastening part 26 is provided, which is fastened to the outside of the casing tube 6 over its length and width.

The guide element 16 is also sufficiently long or wide in the axial direction and in the circumferential direction to ensure reliable guidance of the casing tube 6 in the guide tube 13.

It should be noted that the "top" and "bottom" indications for the position of the guide elements 15, 15', 16 relate to the representation according to the drawings. In the installed position of the adjustment device, the guide elements 15, 15', 16 can also assume a different position.

The bulge 17 and the slot 25 are located in an area of the guide tube 13 that has a larger diameter than the part of the guide tube 13 that has the guide element 16. This smaller diameter part of the guide tube 13 forms the end section of the guide tube 13 and is significantly shorter than the remaining, larger diameter part of the guide tube 13 (FIG. 8).

The guide element 16 is formed by a guide bushing which is attached to the inner wall of the guide tube 13 in its end section and surrounds the casing tube 6. The bushing-shaped guide element 16 guides the casing tube 6 perfectly during its displacement. The prism shape of the guide elements 15, 15' also contributes to the secure sliding guidance of the casing tube 6 in the guide tube 13.

In order to be able to move the casing tube 6 in its longitudinal direction, a length adjustment drive 27 is provided (FIG. 2), which has a threaded spindle 28 which runs parallel to the toothed shaft 5/to the casing tube 6. A drive nut 29 sits on the threaded spindle 28 and is moved along the threaded spindle 28 depending on the direction of rotation of the threaded spindle 28.

The drive nut 29 is firmly connected to the casing tube 6, which is displaced in the respective direction relative to the guide tube 13 on the threaded spindle 28 depending on the direction of movement of the drive nut 29. The drive nut 29 has a connecting part (not shown) which projects through the axially extending slot 25 of the guide tube 13 and is attached to the casing tube 6.

The free end of the threaded spindle 28 is rotatably mounted in a bearing 30, which is attached to a lifting ring 31 (FIGS. 2 and 20), which surrounds the casing tube 6 and is attached to the free end of the guide tube 13.

Figure 1:
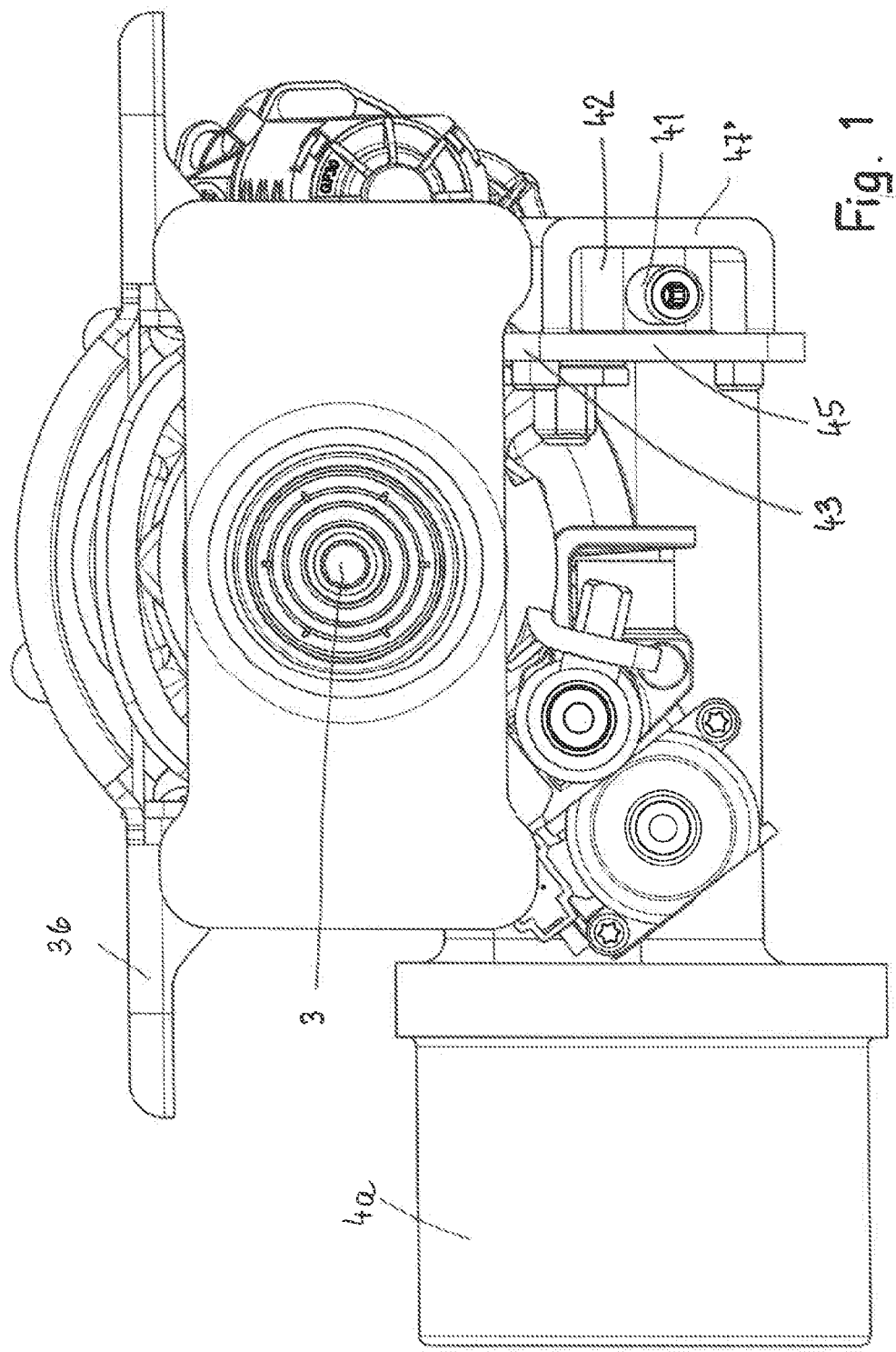
FIG. 1 shows a front view of a steering column adjustment device.
Figure 2:
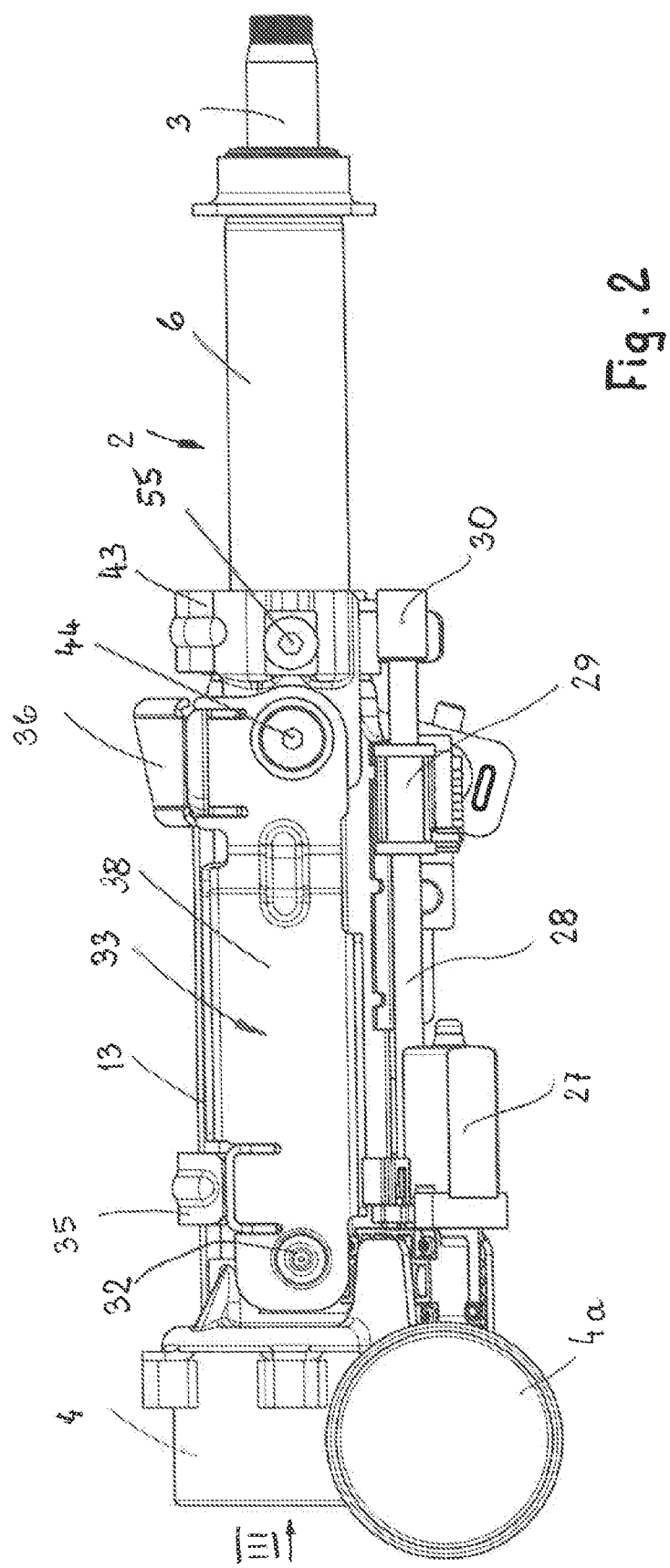
FIG. 2 shows a side view of the steering column adjustment device according to FIG. 1.
Figure 3:
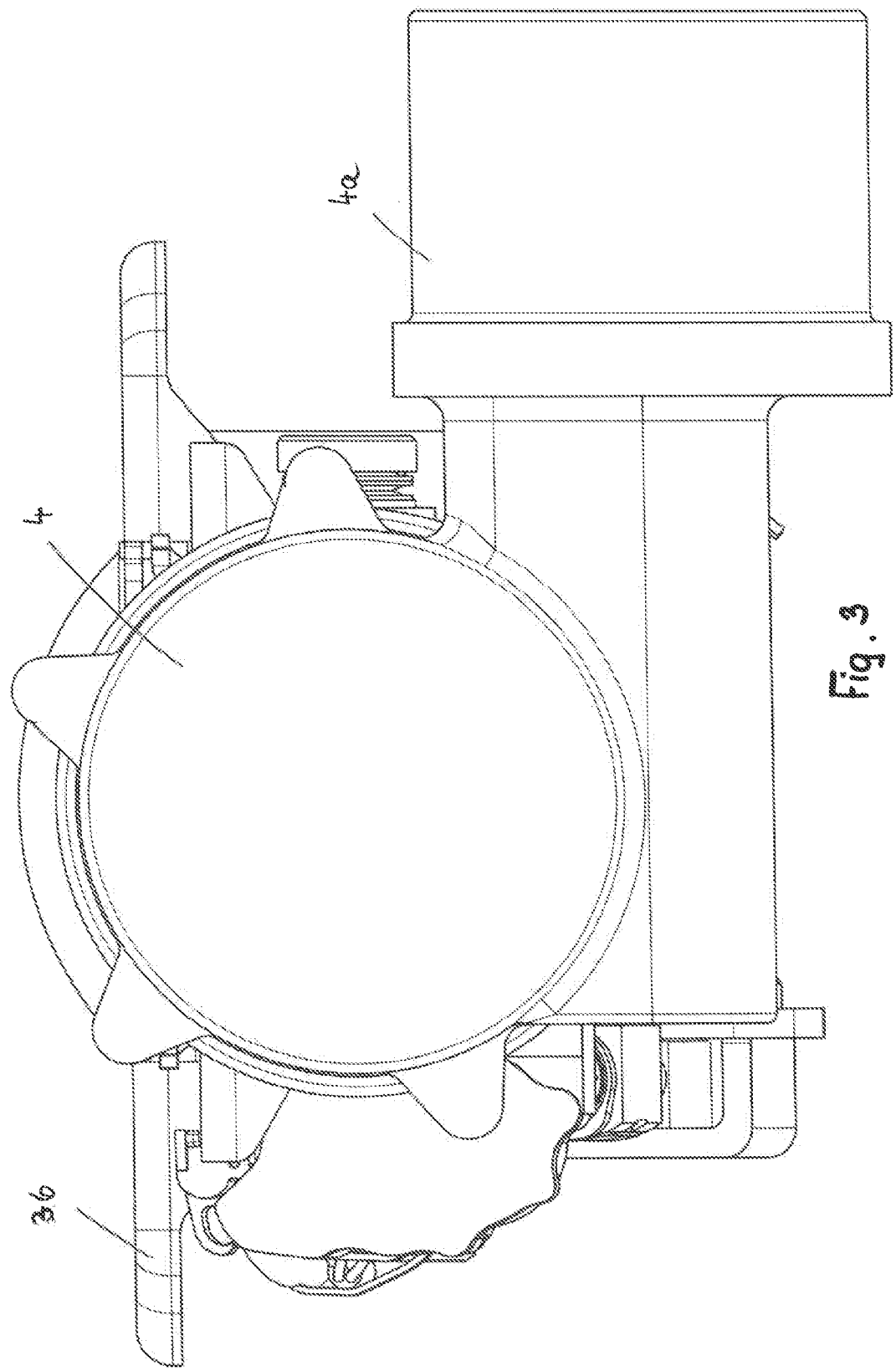
FIG. 3 is a view in the direction of arrow III in FIG. 2.
Figure 14:
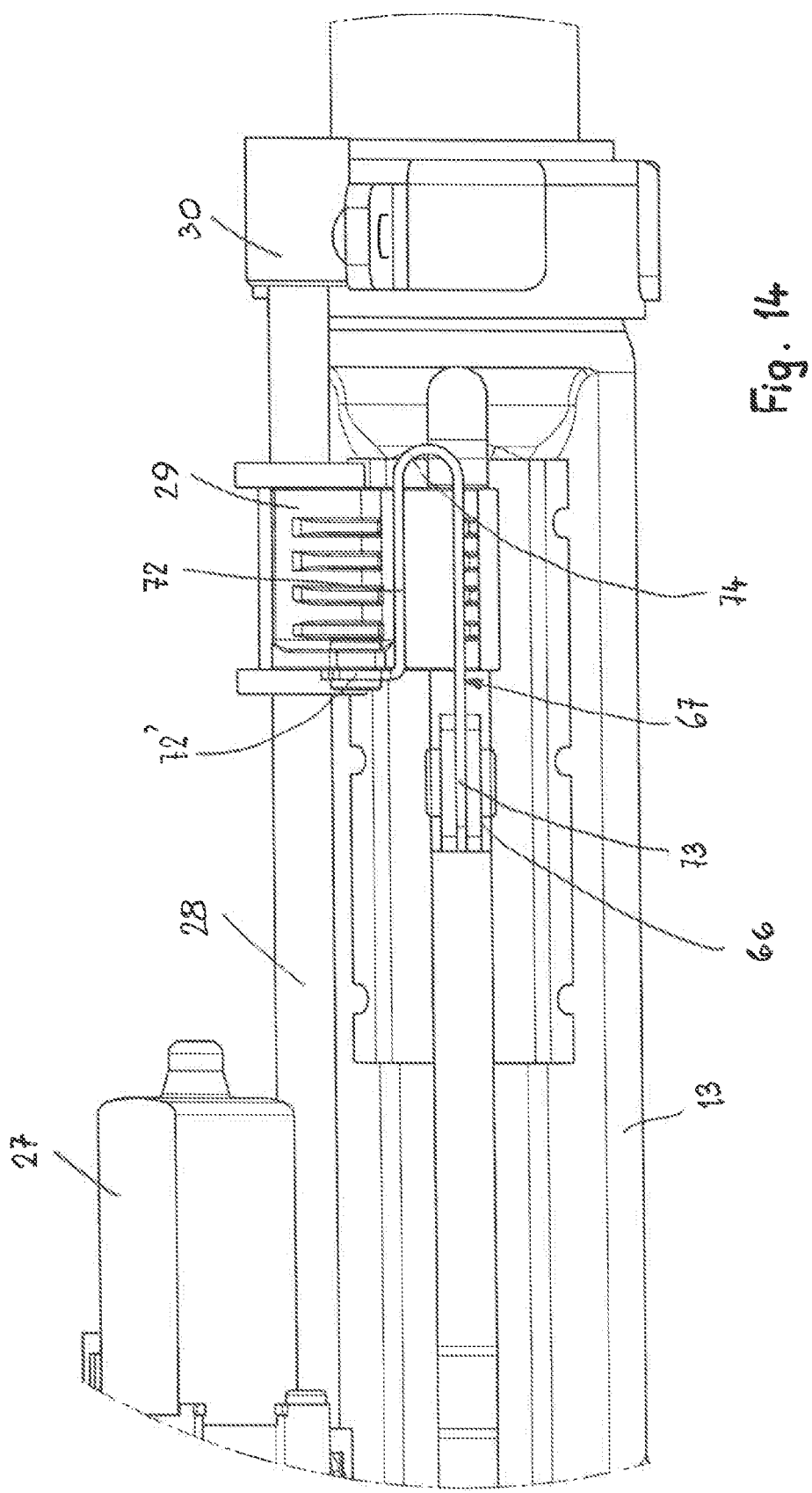
FIG. 14 shows a part of the steering column adjustment device in the driving position with a crash device.

The threaded spindle 28 runs in the area next to the guide tube 13 (FIGS. 2 and 14).

In the manner described, the longitudinal adjustment of the casing tube 6 and thus of the steering element 1 is achieved with only a single length adjustment drive 27, which has a cost-saving effect on the production of the adjustment device. In addition, this measure helps to keep the adjustment device compact without impairing the functionality of the adjustment device.

Figure 23:
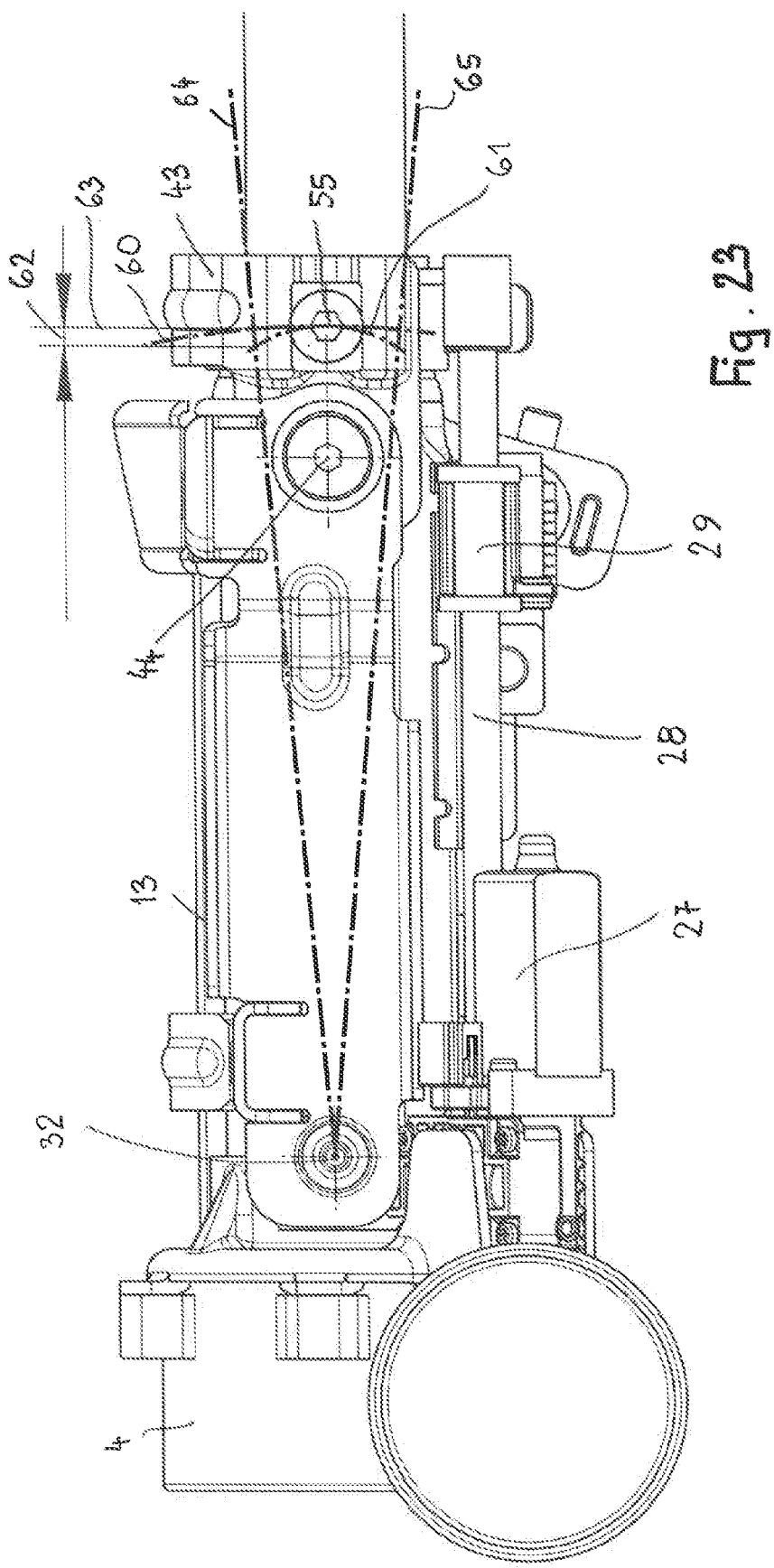
FIG. 23 shows the area according to FIG. 22 in a top view.

The steering shaft 2 can also be pivoted about an axis 32 (FIG. 23) lying perpendicular to the guide tube 13 in order to also adjust the steering shaft 2 and thus the steering element 1 in the height direction. In FIG. 23, the pivoting range of the steering shaft in the height direction is indicated by dash-dotted lines 64, 65.

Figure 4:
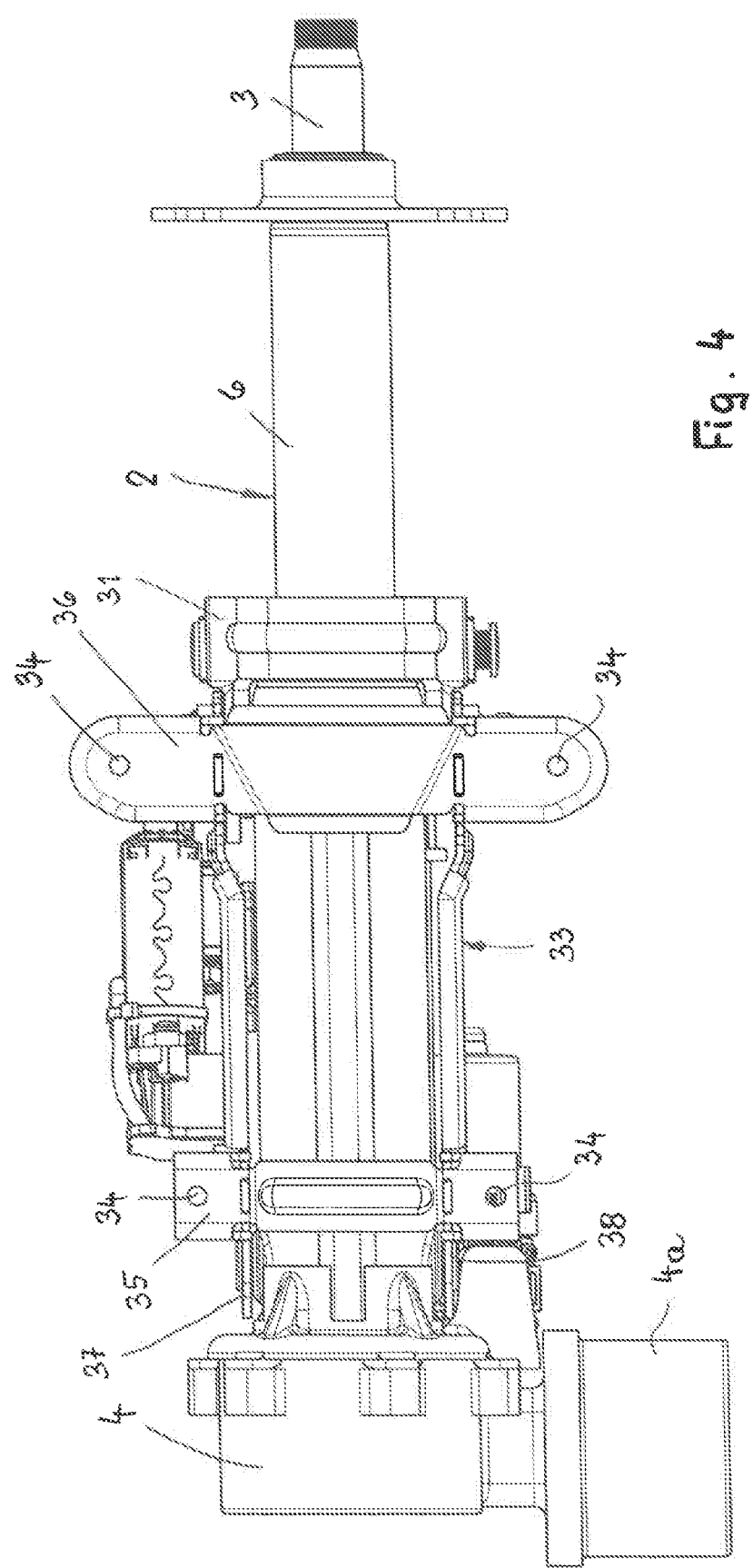
FIG. 4 shows a top view of the steering column adjustment device according to FIG. 1.
Figure 5:
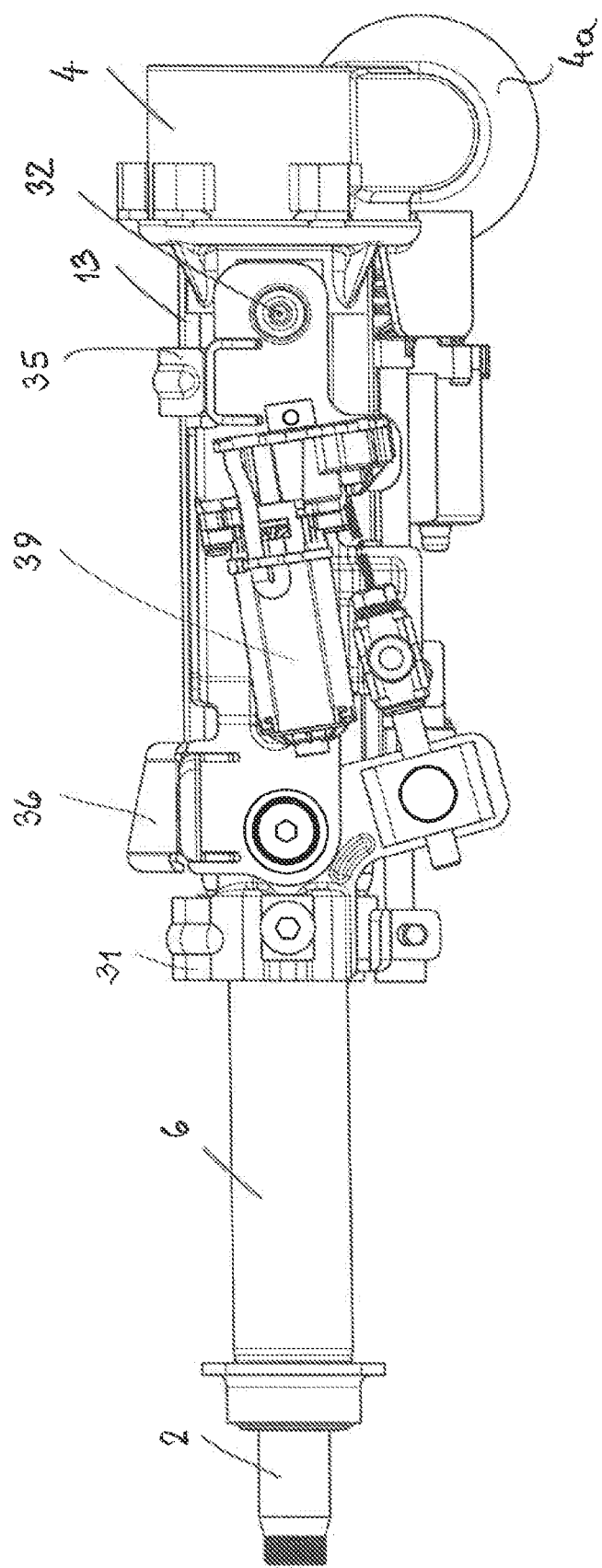
FIG. 5 shows a side view of the steering column adjustment device.

To form the pivot axis 32, the steering shaft 2 is pivotally mounted on a holder, which is preferably designed as a bearing bracket 33 (FIG. 2). The bearing bracket 33 is attached to the vehicle in a suitable manner. FIG. 4 shows fastening points 34 that are provided on the bearing bracket 33, by which the bearing bracket 33 is connected to the vehicle. In the exemplary embodiment, the fastening points 34 are passage openings for screws with which the bearing bracket 33 is fastened in the vehicle. The fastening points 34 are provided on cross members 35, 36 which extend transversely to the longitudinal axis of the steering shaft 2 and which protrude transversely to the axis of the steering shaft 2 over the guide tube 13 in such a way that the fastening points 34 lie laterally next to the steering shaft 2. This makes it possible to easily attach the bearing bracket 33 and thus the steering shaft 2 in the vehicle.

The cross members 35, 36 are firmly connected to two side members 37, 38 of the bearing bracket 33 (FIG. 4). The side members 37, 38 are advantageously thin side walls, between which the steering shaft 2 extends.

To adjust the height of the steering shaft 2, a height adjustment drive 39 is provided (FIG. 19), which is arranged on the bearing bracket 33, in particular on its side member 38. It rotatably drives a threaded spindle 41 via a flexible shaft 40, which is only shown schematically. A drive nut 42 sits on it and is moved depending on the direction of rotation of the threaded spindle 41.

An adjustment lever 43 is pivotally mounted on the drive nut 42. When adjusting the height of the steering shaft 2, the adjustment lever 43 pivots about an axis 44, which extends perpendicular to the axis of the casing tube 6/the guide tube 13. The adjustment lever 43 has a lever arm 45, which is seated on the drive nut 42.

The drive nut 42 has, for example, a circular outline. The lever arm 45 is provided with a corresponding circular passage opening 46 through which the drive nut 42 protrudes and the edge of which rests against the drive nut 42 with at most little play.

If the drive nut 42 is displaced in its axial direction by rotating the threaded spindle 41, the adjustment lever 43/its lever arm 45 can rotate about the axis 42' of the drive nut 42. In the process, the adjustment lever 43 is rotated about the axis 44.

Figure 20:
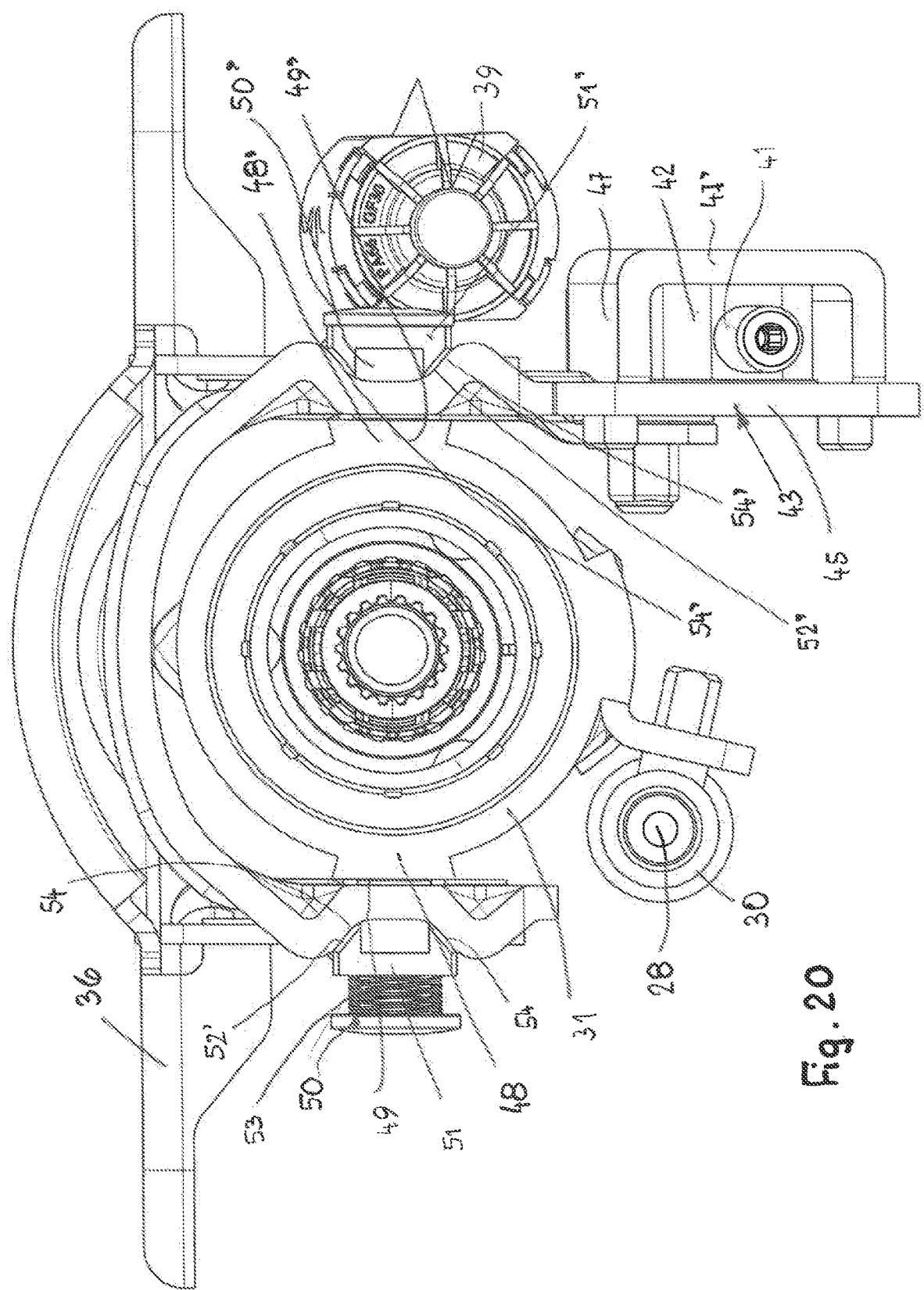
FIG. 20 is a front view of the steering column adjustment device with sliding guides.

As can be seen from FIG. 20, the lever arm 45 has on its outside a U-shaped holding part 47, which is attached to the lever arm with its two legs and the web 47' of which has the passage opening 47 for the drive nut 42. The U-shaped holding part 47 covers the drive nut 42, thereby protecting it against damage.

The lever arm 45 is an extension of the adjustment lever 43, which surrounds the lifting ring 31 at a distance over part of its circumference.

The lifting ring 31 has diametrically opposed thickenings 48, 48', which advantageously have flat and parallel end faces 49, 49'. An outwardly projecting axle bolt 50, 50' is attached to each of them and protrudes outwards through slot-shaped openings 76 (FIG. 32) in the adjustment lever 43. A sliding piece 51, 51' is seated on each of the axle bolts 50, 50' in a freely rotatable manner and interacts in each case with a sliding guide 52, 52' extending in the axial direction of the adjustment lever 43.

The sliding guides 52, 52' are formed by correspondingly deformed sections of the adjustment lever 43. They are designed as depressions into which the sliding pieces 51, 51' protrude from the outside.

At least one compression spring 53 is seated on the axle bolt 50 and presses the sliding piece 51 against the bottom of the sliding guide 52. The compression spring 53 is supported on the head of the axle bolt 50. Since the diametrically opposite sliding guide 52' is part of the lifting ring 31, the opposite sliding piece 51' is also pressed against the sliding guide 52' by the force of the compression spring 53.

The sliding guides 52, 52' have outwardly diverging side walls 54, 54', against which the sliding pieces 51, 51' rest with contour-adapted sections.

The compression spring 53 forms a compensating element that reliably removes any play between the adjustment lever 43 and the sliding pieces 51, 51'.

Figure 22:
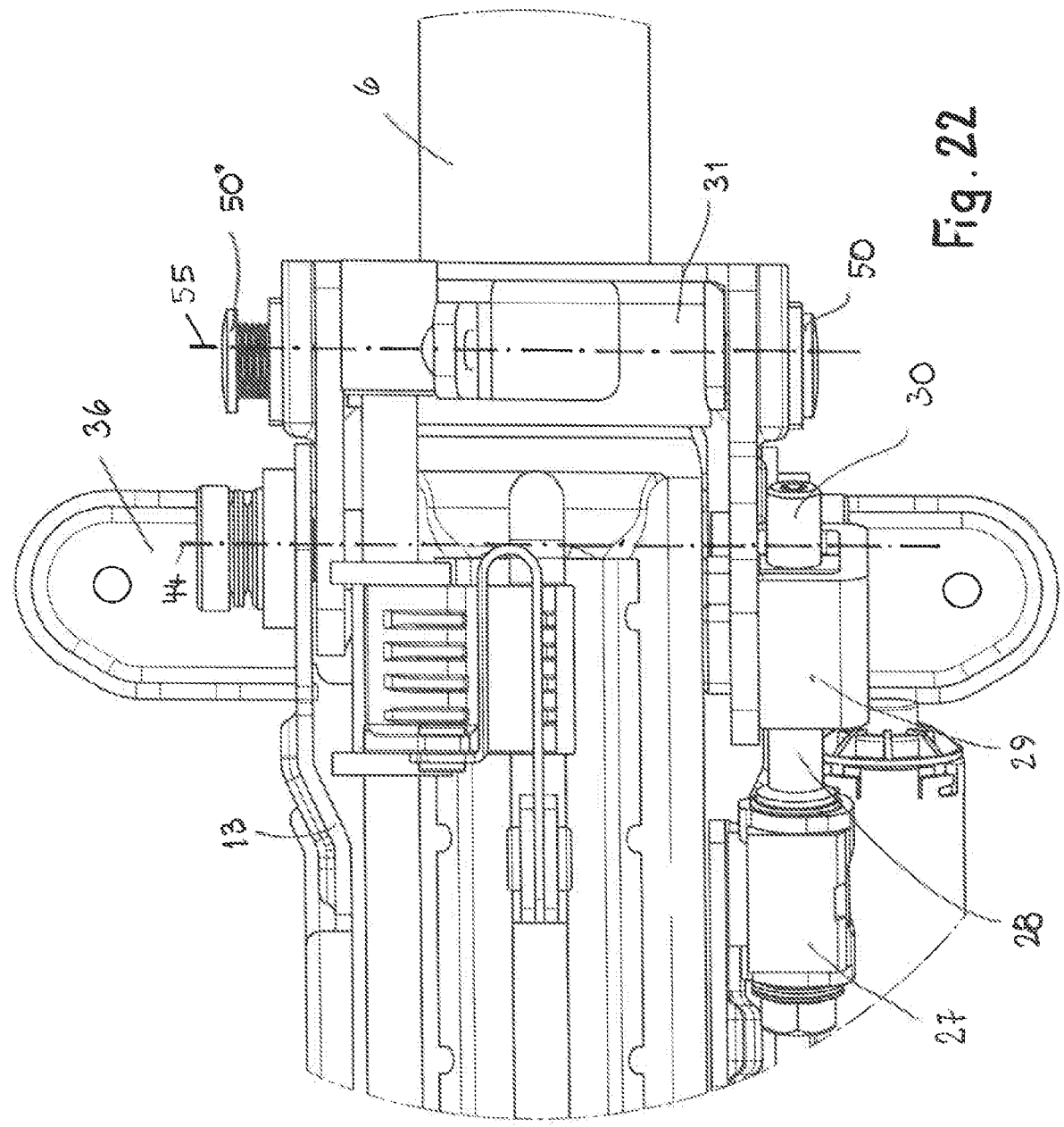
FIG. 22 is a top view of a pivot bearing area of an adjusting element of the steering column adjustment device.

When adjusting the height of the steering shaft 2, not only does the adjustment lever 43 pivot about the axis 44, but also about an axis 55, which is formed by the axis of the two opposite axle bolts 50, 50' (FIG. 22).

Figure 21:
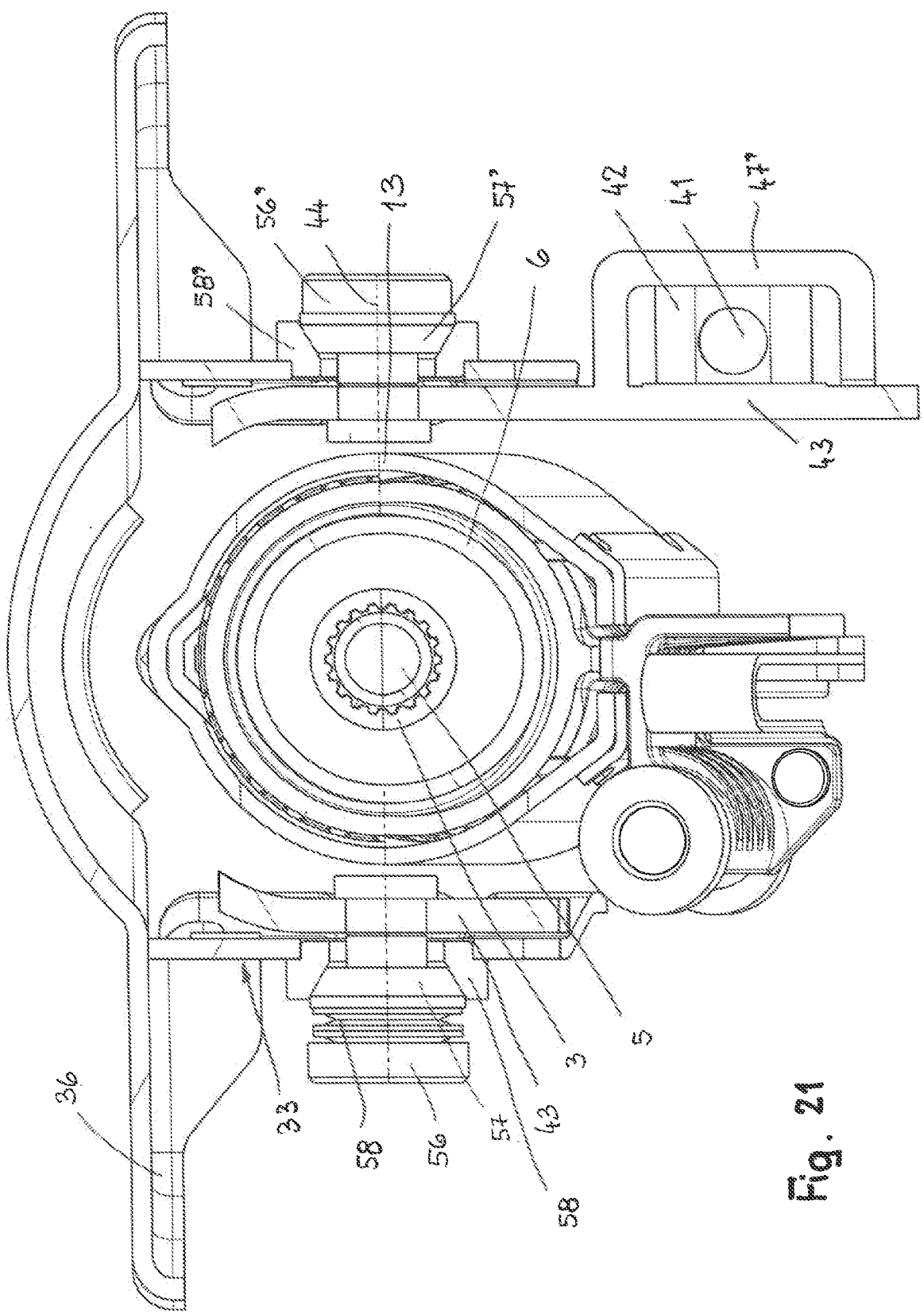
FIG. 21 is a front view of the pivot bearing of the steering column adjustment device.

The pivoting/rotating design of the adjustment lever 43 is explained in more detail with reference to FIGS. 21 and 22.

The axis of rotation 44 is defined by two axle bolts 56, 56', which are each connected to the adjustment lever 43 with the interposition of a respective bearing 57, 57'. The bearing 57 is under the force of at least one compression spring 58, which serves as a compensating element and presses out any play that may occur between the adjustment lever 43 and the bearing bracket 33. The compression spring 58 is supported on the head of the axle bolt 56 and ensures that there is no play in the area of both axle bolts 56, 56'. This ensures that the adjustment lever 43 can be pivoted properly when adjusting the height of the steering shaft 2.

The bearings 57, 57' are supported on counter bearings 58, 58' of the bearing bracket 33.

According to FIG. 22, the rotation/pivot axes 44 and 55 of the adjustment lever 43 are parallel to each other and perpendicular to the axis of the casing tube 6/the guide tube 13. The axis 55 is at a smaller distance from the free end of the guide tube 13 than the axis 44.

Figure 17:
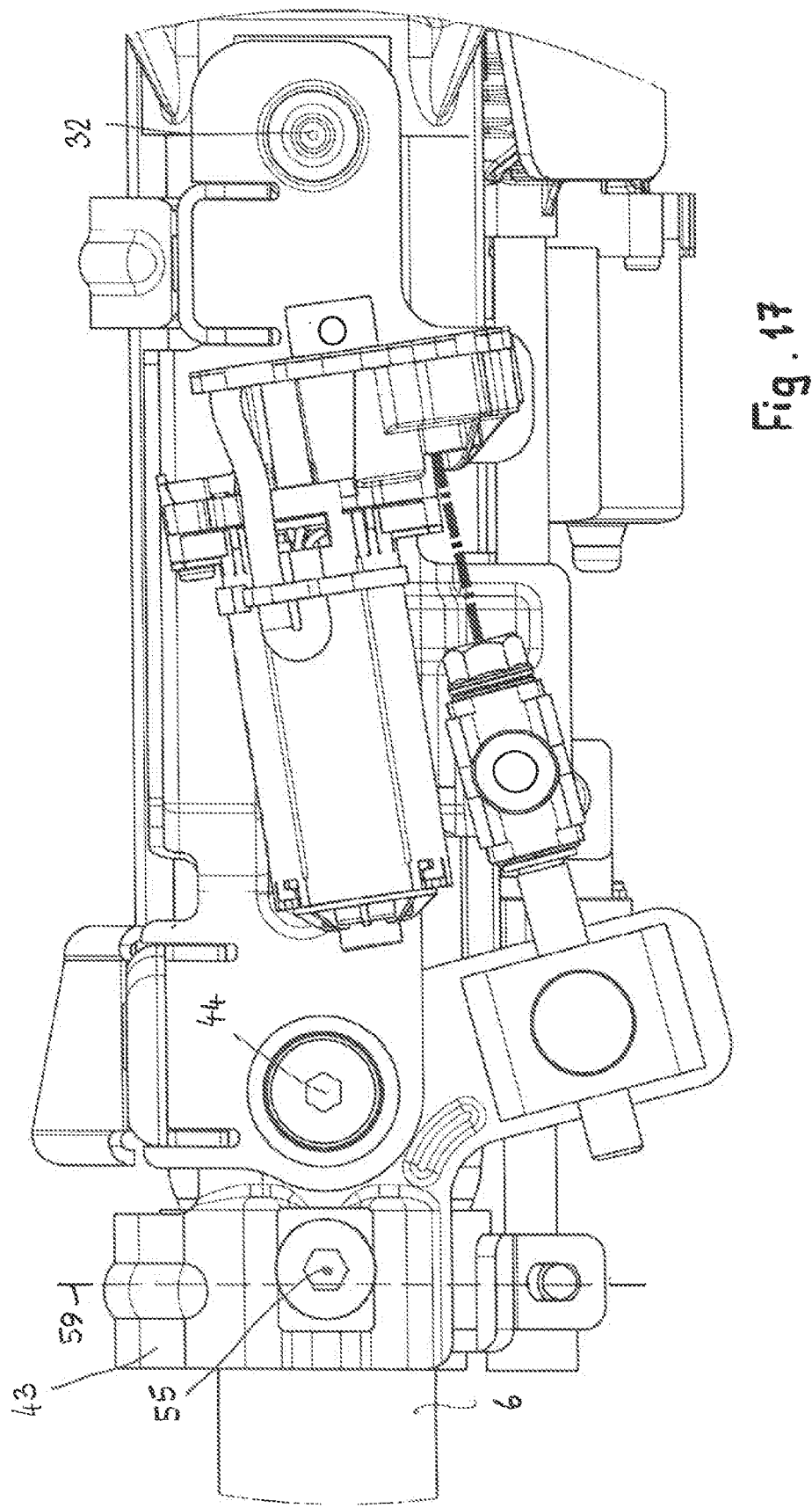
FIG. 17 shows, in a representation corresponding to FIG. 16, the steering column adjustment device in a middle steering wheel position.
Figure 18:
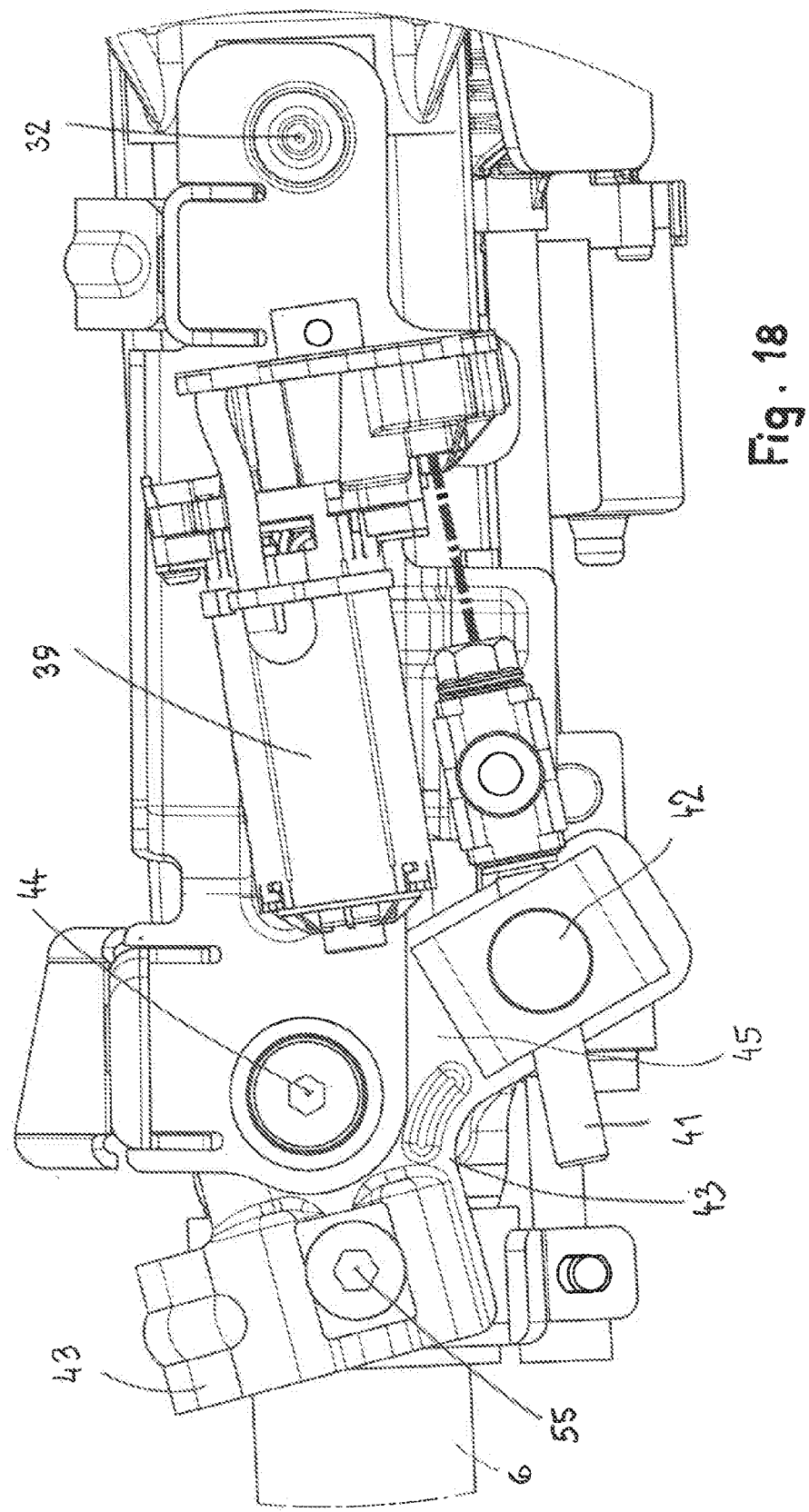
FIG. 18 shows, in a representation corresponding to FIG. 16, the steering column adjustment device in a lower steering wheel position.
Figure 19:
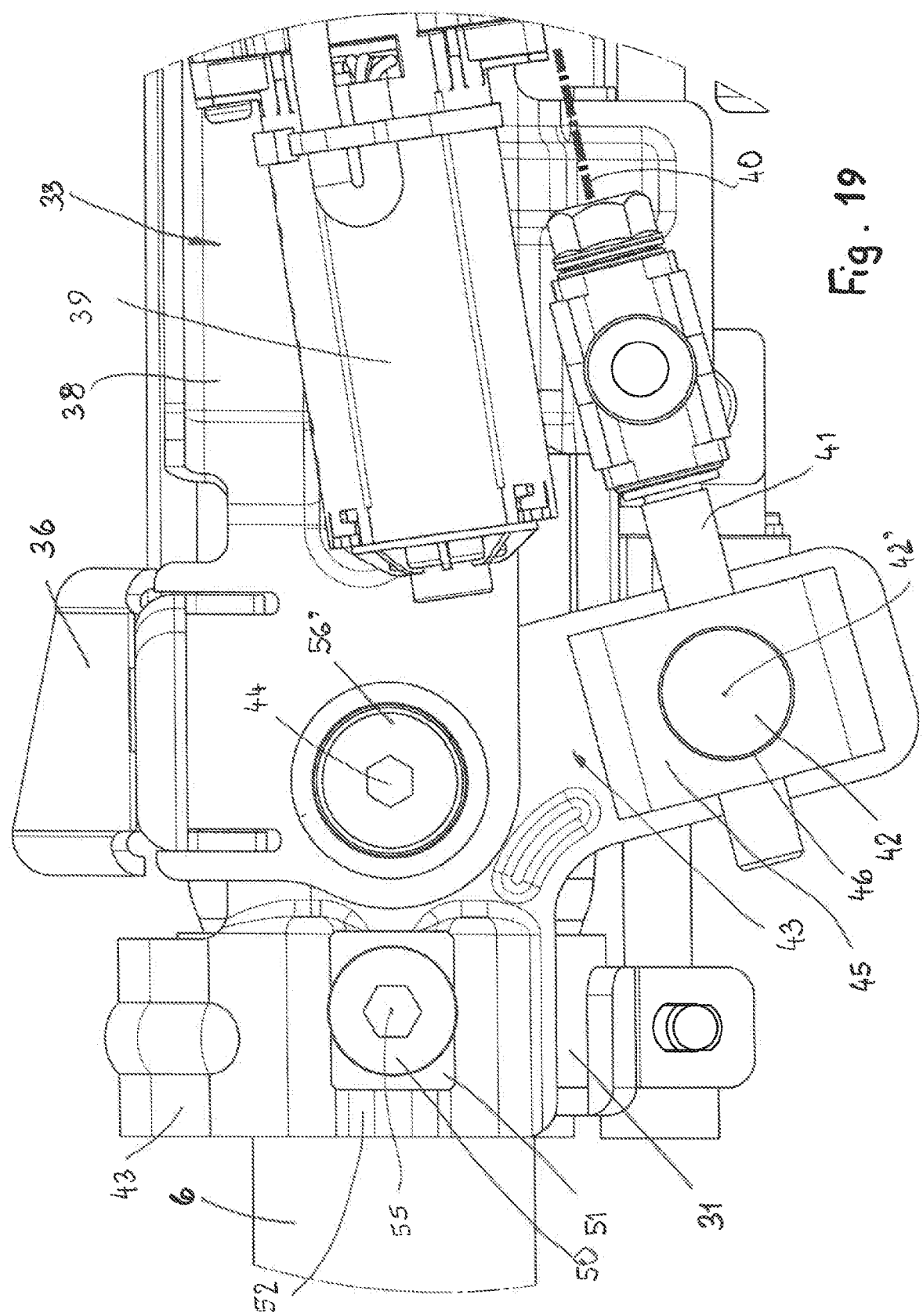
FIG. 19 shows an enlarged view of part of the steering column adjustment device according to FIG. 17.

FIGS. 17 to 19 show different positions of the adjustment lever 43 relative to the lifting ring 31 when adjusting the height of the steering shaft 2.

FIG. 17 shows a position in which the steering element 1 is in a central position. The adjustment lever 43 is arranged so that its axial plane of symmetry 59 is perpendicular to the casing tube 6. As a result, the axes of the casing tube 6 and the adjustment lever 31 run parallel to each other, as seen in the direction of the axis of rotation 55 of the adjustment lever 431 (FIG. 17).

In order to adjust the steering element 1 into a lower position, the drive 39 rotates the threaded spindle 41 in such a way that the drive nut 42 is moved to the right in FIG. 18. As a result, the adjustment lever 43 is pivoted counterclockwise about the axis 44 via the lever arm 45 and about the axis 55 relative to the lifting ring 31. Since the lifting ring 31 and the adjustment lever 43 are connected to the guide tube 13, the latter is pivoted downwards at an angle together with the casing tube 6 in the illustration according to FIG. 17.

Figure 16:
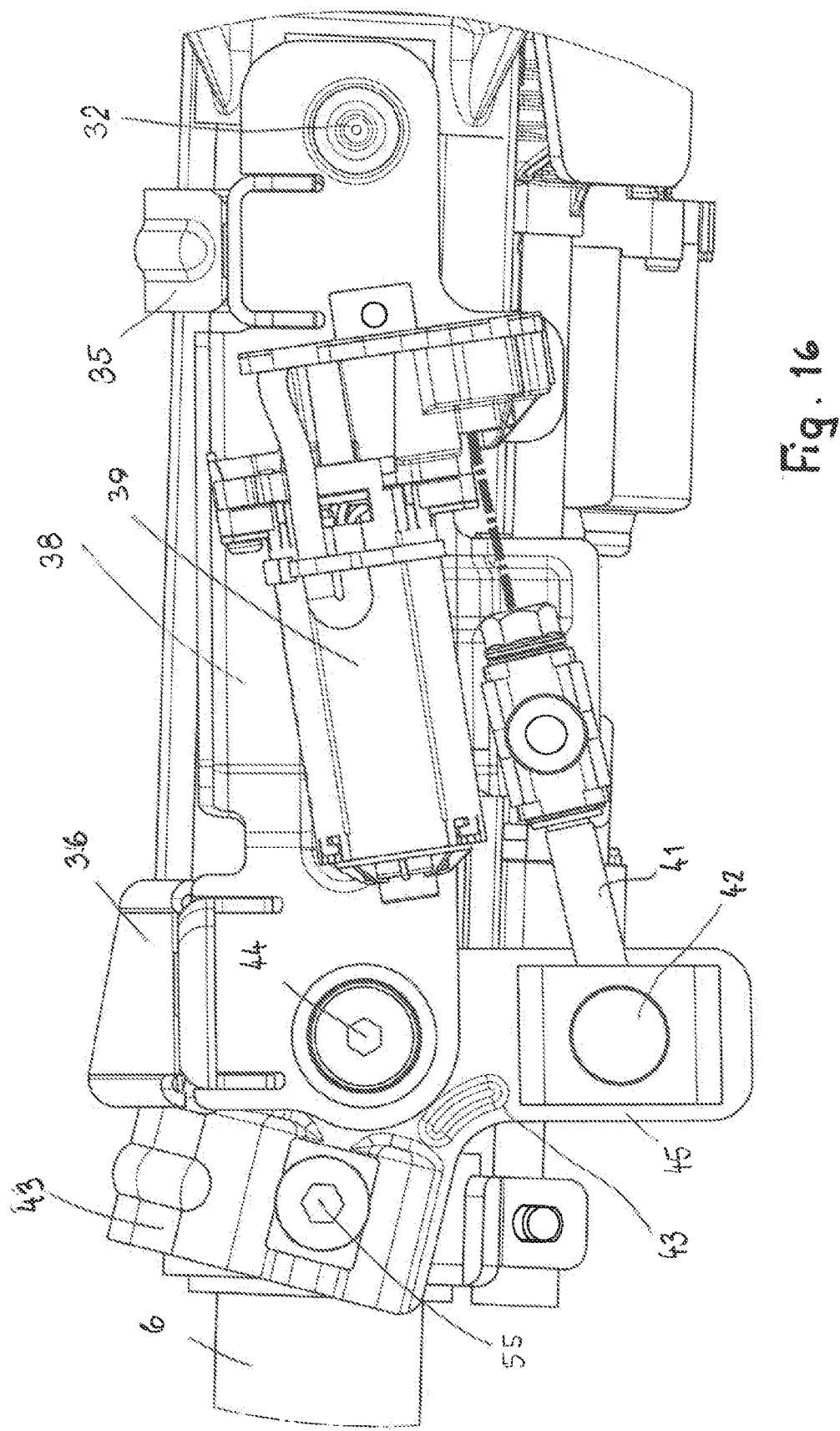
FIG. 16 shows the steering column adjustment device in an upper steering wheel position.

FIG. 16 shows the position when the steering element 1 has been adjusted into its upper position. In this case, the threaded spindle 41 is rotated so that the drive nut 42 is shifted to the left in FIG. 16, starting from the middle position according to FIG. 17. The adjustment lever 43 is thereby pivoted clockwise about the axis 44 via the lever arm 45. In addition, it is also pivoted clockwise relative to the lifting ring 31 about the axis 55. As a result, the steering shaft 2 is pivoted upward about the axis 32 (FIG. 16).

When the adjustment lever 43 is pivoted relative to the lifting ring 31 about the axis 55, the sliding pieces 51, 51' slide in the sliding guides 52, 52' of the adjustment lever 43, so that no clamping occurs between the lifting ring 31 and the adjustment lever 43. Since the sliding pieces 5, 51' are seated on the axle bolts 50, 50' in a freely rotatable manner, they can be moved in any pivot position of the adjustment lever 43.

FIGS. 16 and 18 show the two maximum positions of the steering shaft 2 when adjusting the height. Between these two end positions, the steering shaft 2 can be adjusted to any desired position by rotating the threaded spindle 41 accordingly.

The two rotation/pivot axes 44, 55 are provided near the free end of the guide tube 13 and are at a relatively small distance from one another. The pivot axis 32 of the steering shaft 2, on the other hand, is located close to the actuator 4 at the other end of the guide tube 13.

As shown in FIG. 23, when adjusting the height of the steering shaft 1, a relatively large lever arm acts when pivoting about the axis 32. The pivoting radius through the axis 55 is indicated by the dot-dash line 60. The radius passing through the pivot axis 55 when pivoting about the axis 44 of the adjustment lever 43 is indicated by the dot-dash line 61. When pivoting the steering shaft for height adjustment, the axial compensation occurs through the different radii in the adjustment lever 43 in the axis 55. Thereby, the high loads during height adjustment can be managed despite the long lever lengths. The axial compensation is marked by dimension 62. The radii 60, 61 and thus the position of the axes 32, 44 are provided so that the radii 60 and 61 touch each other in the pivot axis 55. The plane 63 running through the contact point determines one limit and the intersection of the radius 61 with the straight lines 64, 65 defining the adjustment angle determines the other limit of the axial compensation path 62. With regard to the definition of the axial compensation 62, reference is expressly made to FIG. 23, from which the determination of the axial compensation results.

Figure 13:
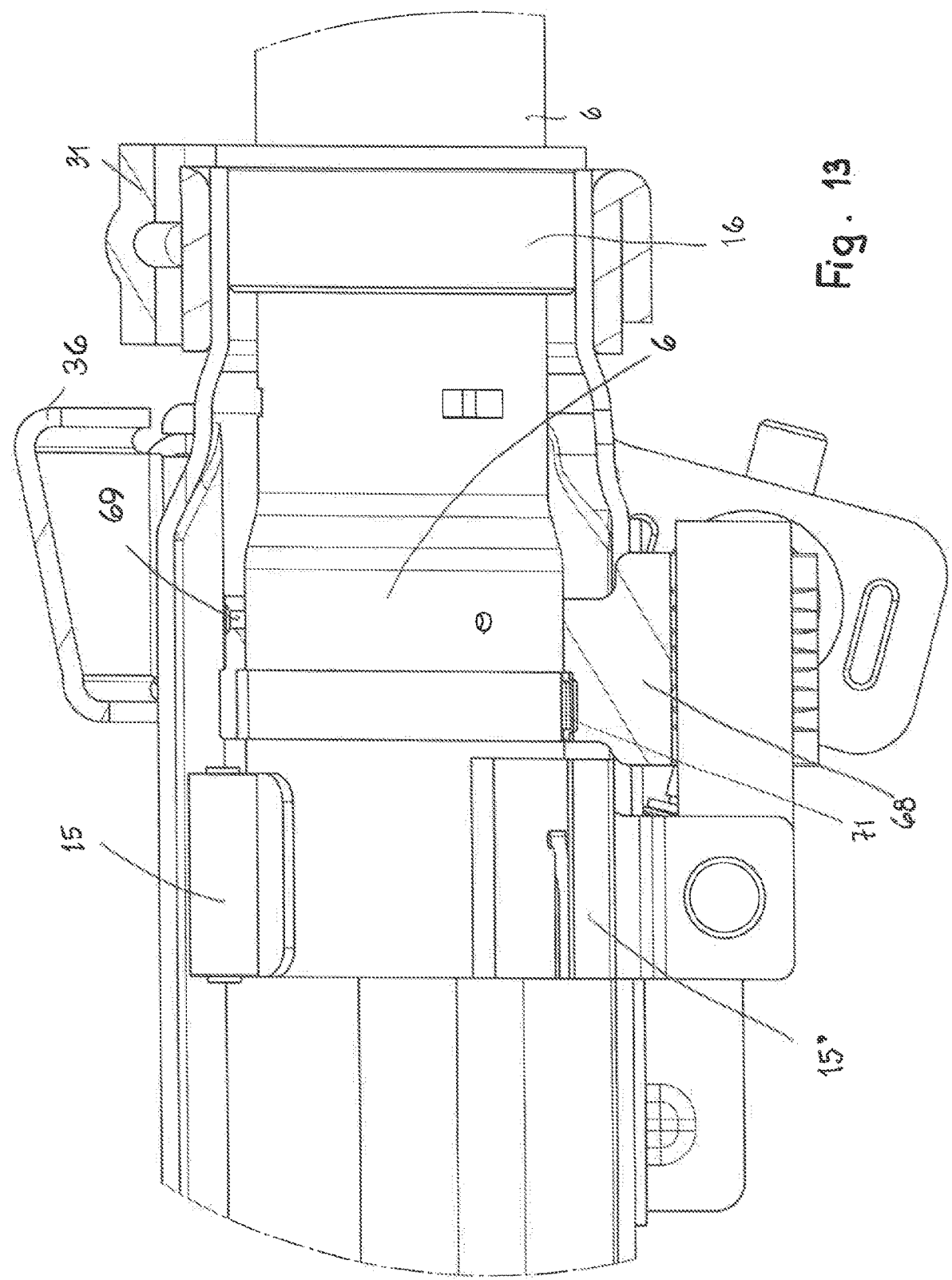
FIG. 13 shows a part of the steering column adjustment device with shear pins.

The adjustment device is additionally equipped with a crash function. A holder 66 is provided on the casing tube 6 near the end lying in the guide tube 13, which protrudes outwards through the axial slot 25 of the guide tube 13 (FIG. 8). A crash absorber 67 is attached to the holder 66 and is also connected to an annular holder 68 accommodated within the guide tube 13. It surrounds the casing tube 6 and is arranged on the inner wall of the guide tube 13. The holder 68 is provided with at least one shear pin 69 on the circumference. As FIG. 13 shows, the shear pins 69 project radially inwards over the annular holder 68 into openings in the casing tube 6.

The holder 68 advantageously has a circumferential ribbing 70 and is advantageously held by means of a tolerance ring 71 surrounding it, which surrounds the casing tube 6.

Figure 12:
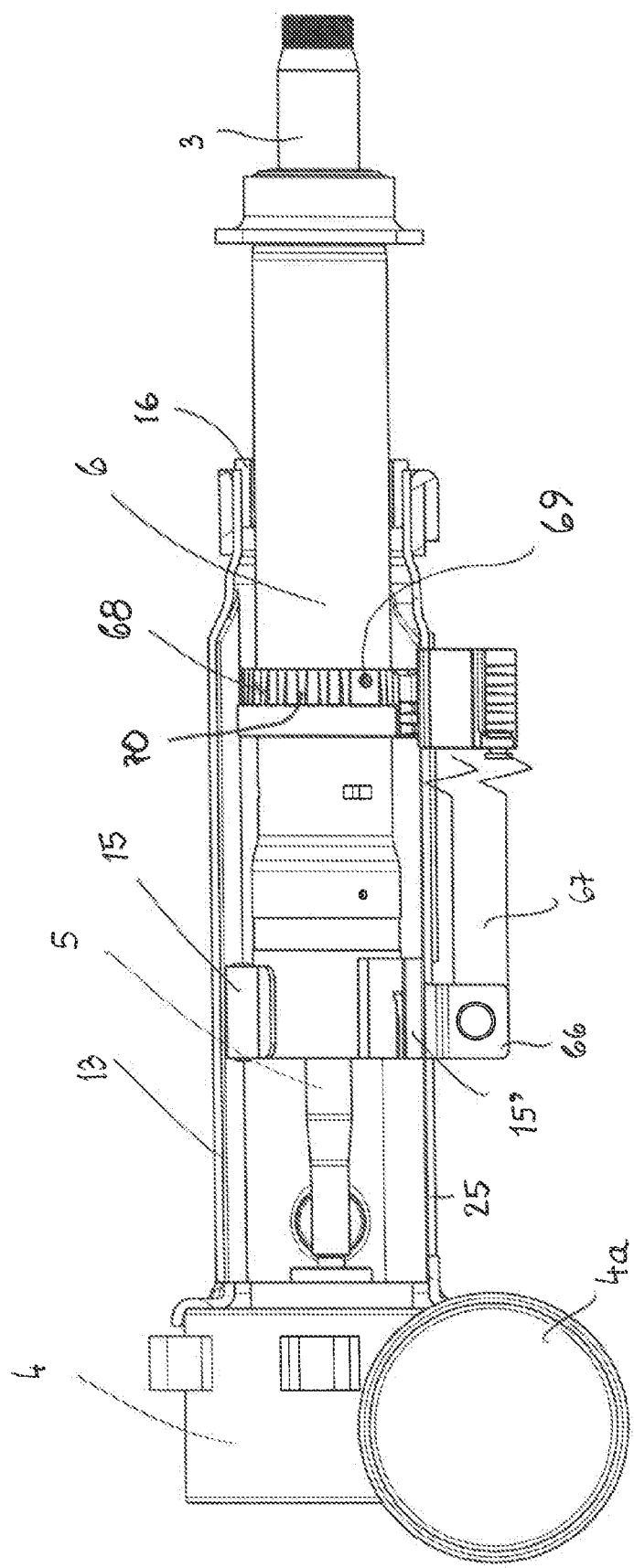
FIG. 12 shows the steering column adjustment device after a crash.

FIG. 12 shows the situation after a crash. By the crash, the casing tube 6 with the steering spindle 3 is moved into the guide tube 13. The force that occurs during a crash is so great that the shear pin 69 is sheared off by the casing tube 6. The crash absorber 67 is deformed by the crash and thereby absorbs a large part of the forces that occur during a crash.

Figure 15:
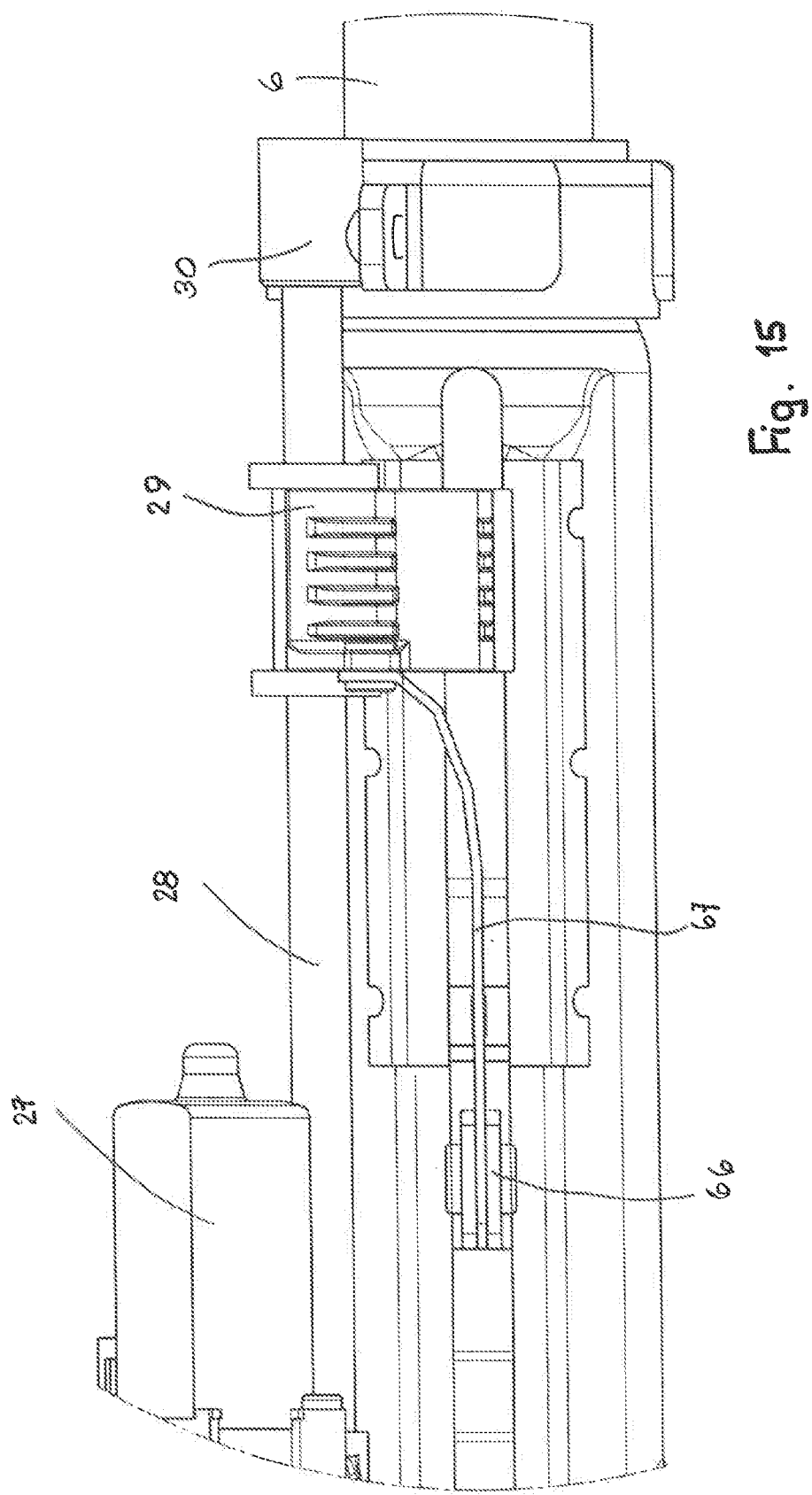
FIG. 15 shows, in a representation corresponding to FIG. 14, the steering column adjustment device according to FIG. 14 after a crash.

FIGS. 14 and 15 show the crash absorber 67 and its attachment to the steering shaft in detail. The crash absorber 67 is essentially U-shaped, one leg 72 of which is fastened to the drive nut 29 by means of a bend 72'. The other leg 73 of the crash absorber 67 is firmly connected to the holder 66.

The two legs 72, 73 are at a distance from one another and merge into one another via a 180° bend piece 74.

In the event of a crash, the holder 66 is taken along by the displaced casing tube 6, while the drive nut 29 maintains its position (FIG. 15). As a result, the U-shaped crash absorber 67 is plastically deformed so that it takes on an elongated shape.

The crash absorber 67 is advantageously formed by a sheet metal strip that is easy to manufacture, assemble and easy to deform in the event of a crash.

Figure 24:
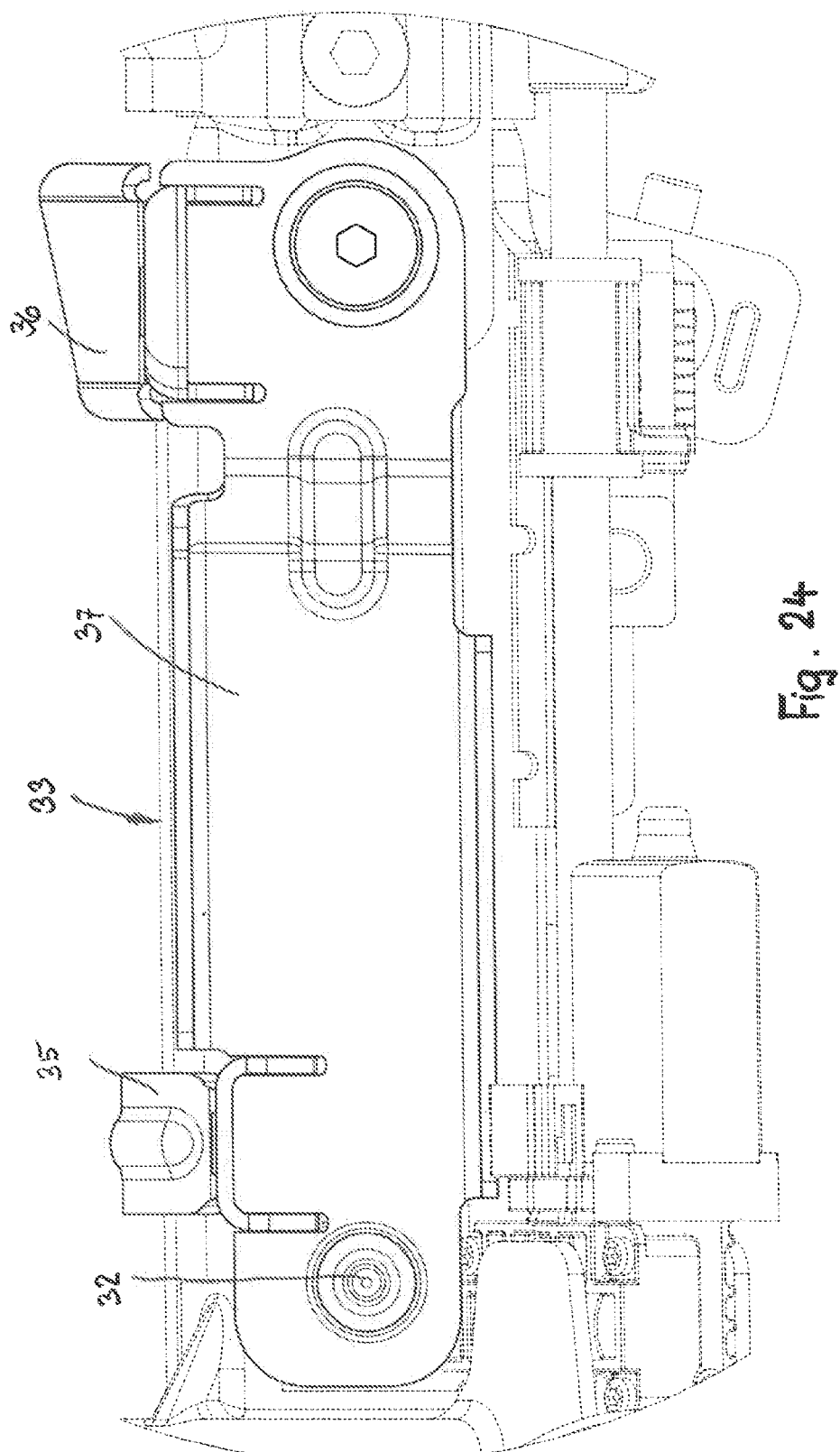
FIG. 24 shows a bearing bracket of the steering column adjustment device.

FIG. 24 shows the bearing bracket 33 with the two cross members 35, 36 and one side member 37. The steering shaft is mounted on the two side members 37, 38 so as to be pivotable about the axis 32. The bearing bracket 33 is fastened to the vehicle by means of the two bridge-like cross members 35, 36. Since both cross members 35, 36 are firmly connected to the side members 37, 38, the bearing bracket 33 is designed for the respective installation situation.

Figure 25:
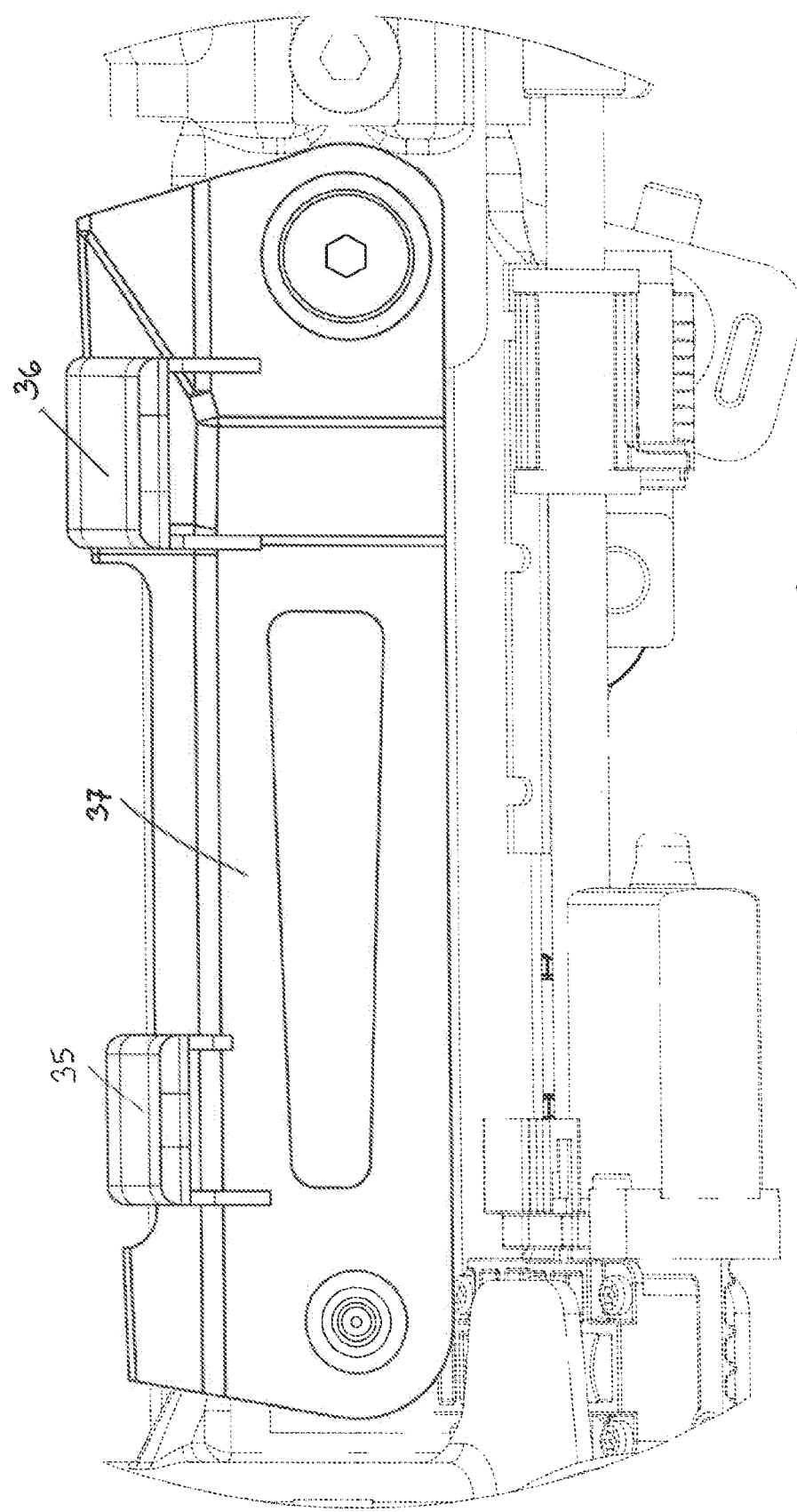
FIG. 25 shows, in a representation corresponding to FIG. 24, a second embodiment of a bearing bracket of the steering column adjustment device.

In the embodiment according to FIG. 25, it is possible to adapt the two bridge-like cross members 35, 36 to the installation situation by allowing the cross members 35, 36 to be displaced along the side members 37, 38/to be fastened to the side members 37, 38 in different positions. The upper edge of the side members 37, 38 runs straight, so that the cross members 35, 36 can easily be mounted in any required position.

Figure 26:
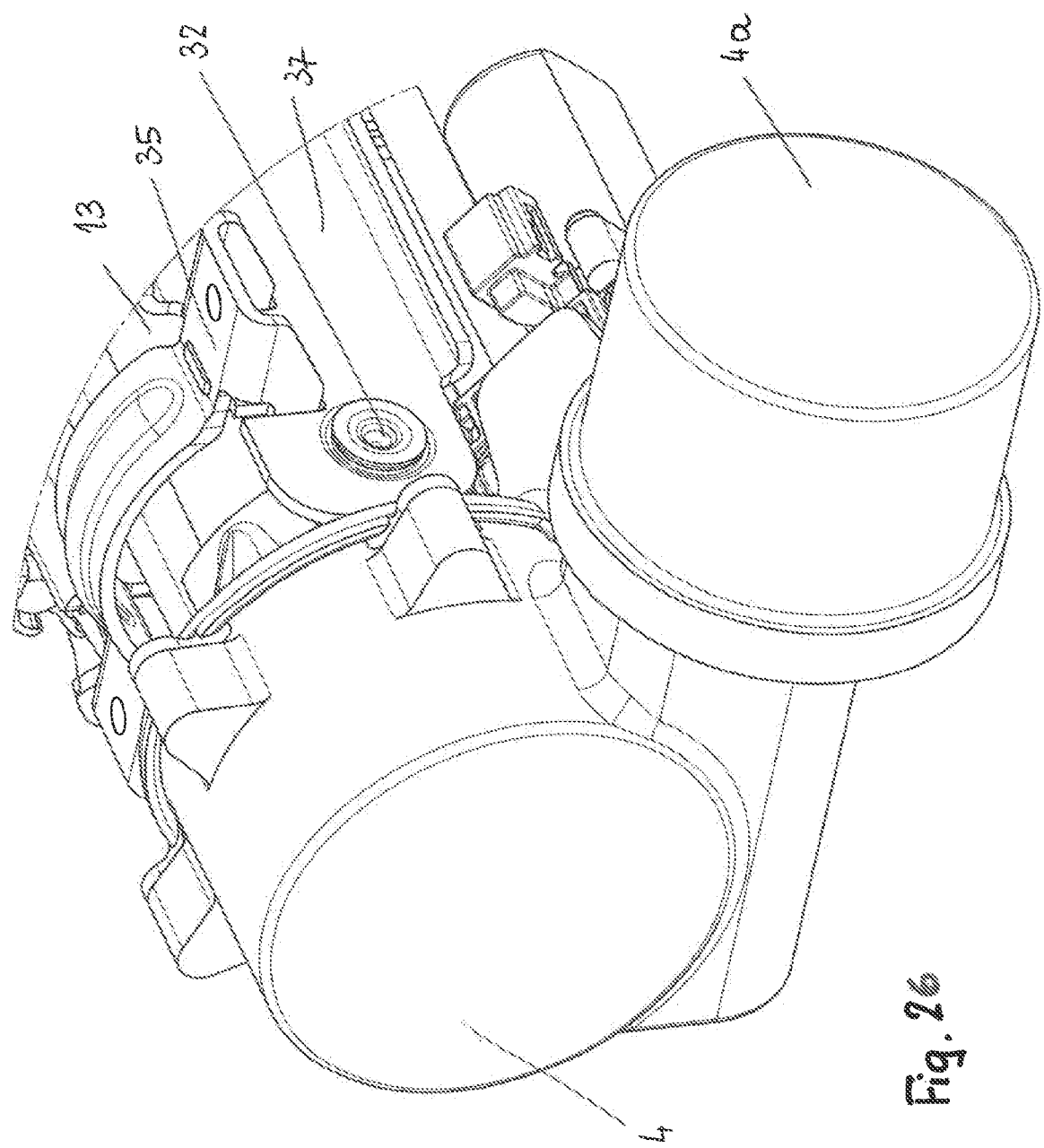
FIG. 26 is a perspective and schematic representation of an actuator of the steering column adjustment device.
Figure 27:
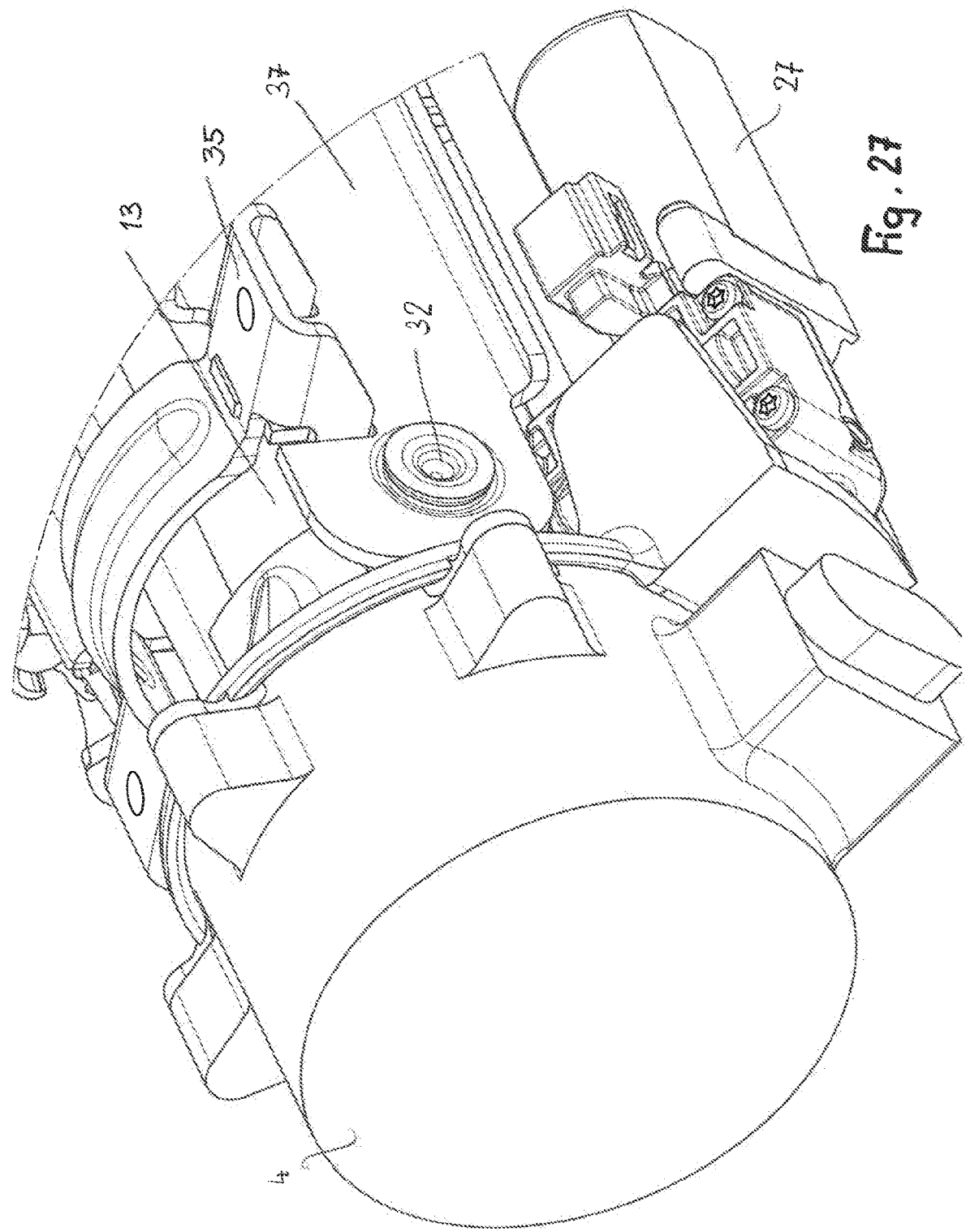
FIG. 27 shows, in a representation corresponding to FIG. 26, the actuator, which is fastened to a guide tube of the steering column adjustment device.

FIGS. 26 and 27 show the actuator 4, which is fixedly connected to the guide tube 13. Therefore, the actuator 4 remains in its position even if the casing tube 6 is moved.

Figure 28:
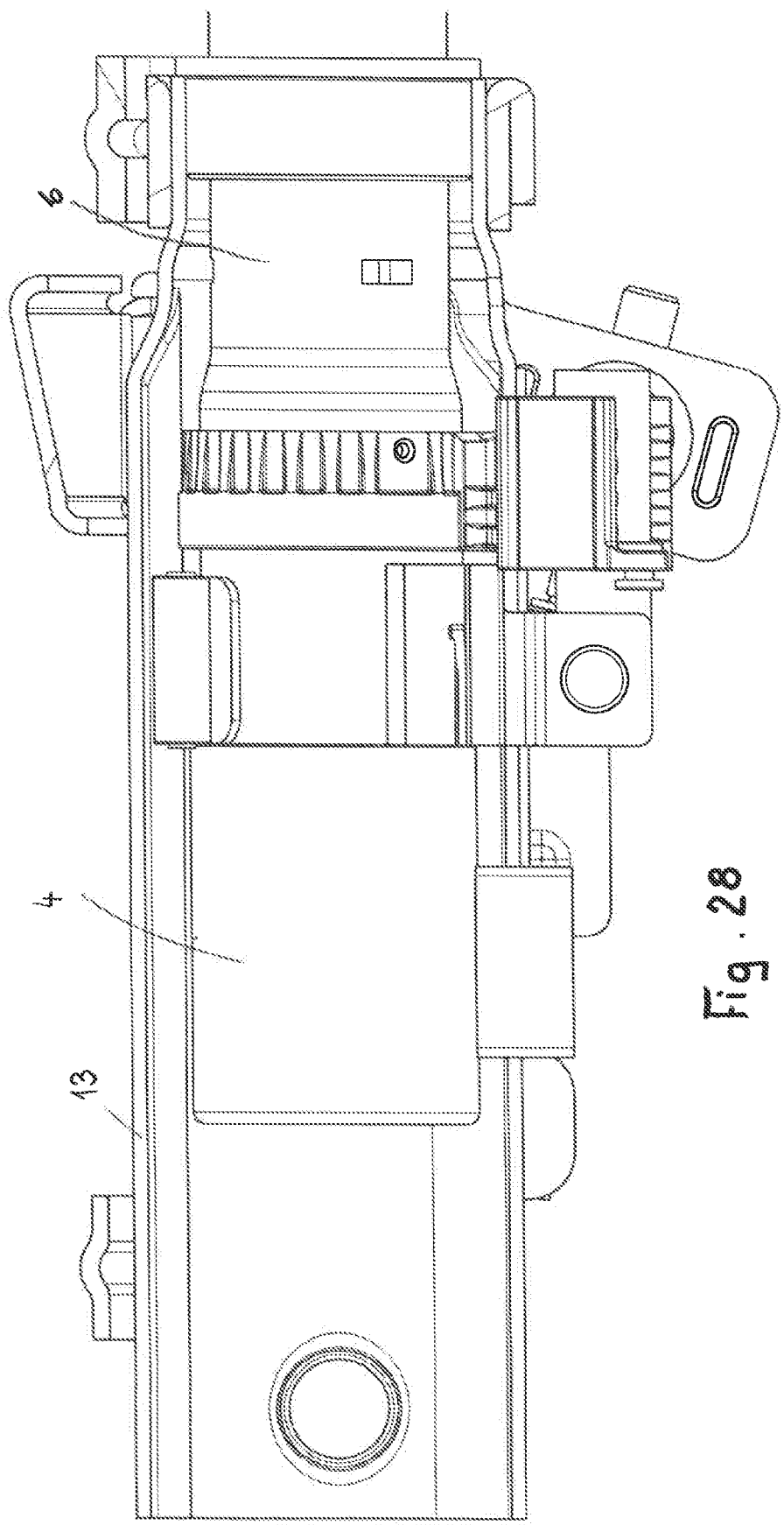
FIG. 28 shows a simplified illustration of an actuator fastened to a casing tube of the steering column adjustment device.

In the embodiment according to FIG. 28, the actuator 4 is attached to the end of the casing tube 6 located within the guide tube 13. As a result, the actuator 4 is moved axially when the casing tube 6 is moved.

Figure 29:
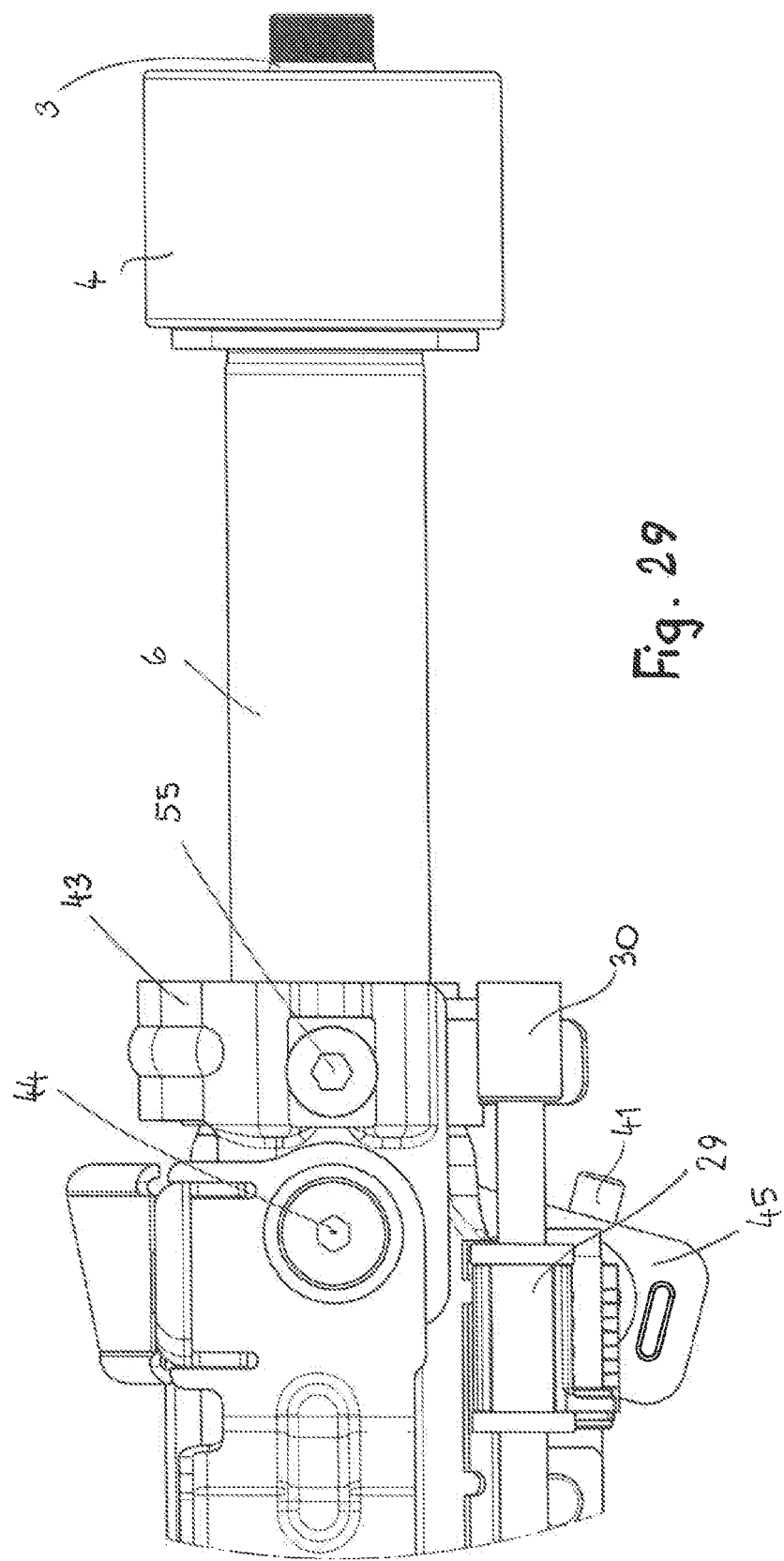
FIG. 29 is a simplified representation of an actuator of the steering column adjustment device provided near the steering wheel.

FIG. 29 shows the possibility of arranging the actuator 4 as close as possible to the steering element 1. In this case, the actuator 4 is advantageously seated on the steering spindle 3. Even with such a design, the actuator 4 is carried along axially when the casing tube 6 is moved in the manner described.

FIG. 30 shows the possibility of arranging at least one sensor 75 on the steering spindle 3. The sensor 75 may be an angle sensor, for example, with which the angular position of the steering spindle 3 is detected.

In principle, it is possible to integrate the sensor 75 into the actuator.

Figure 31:
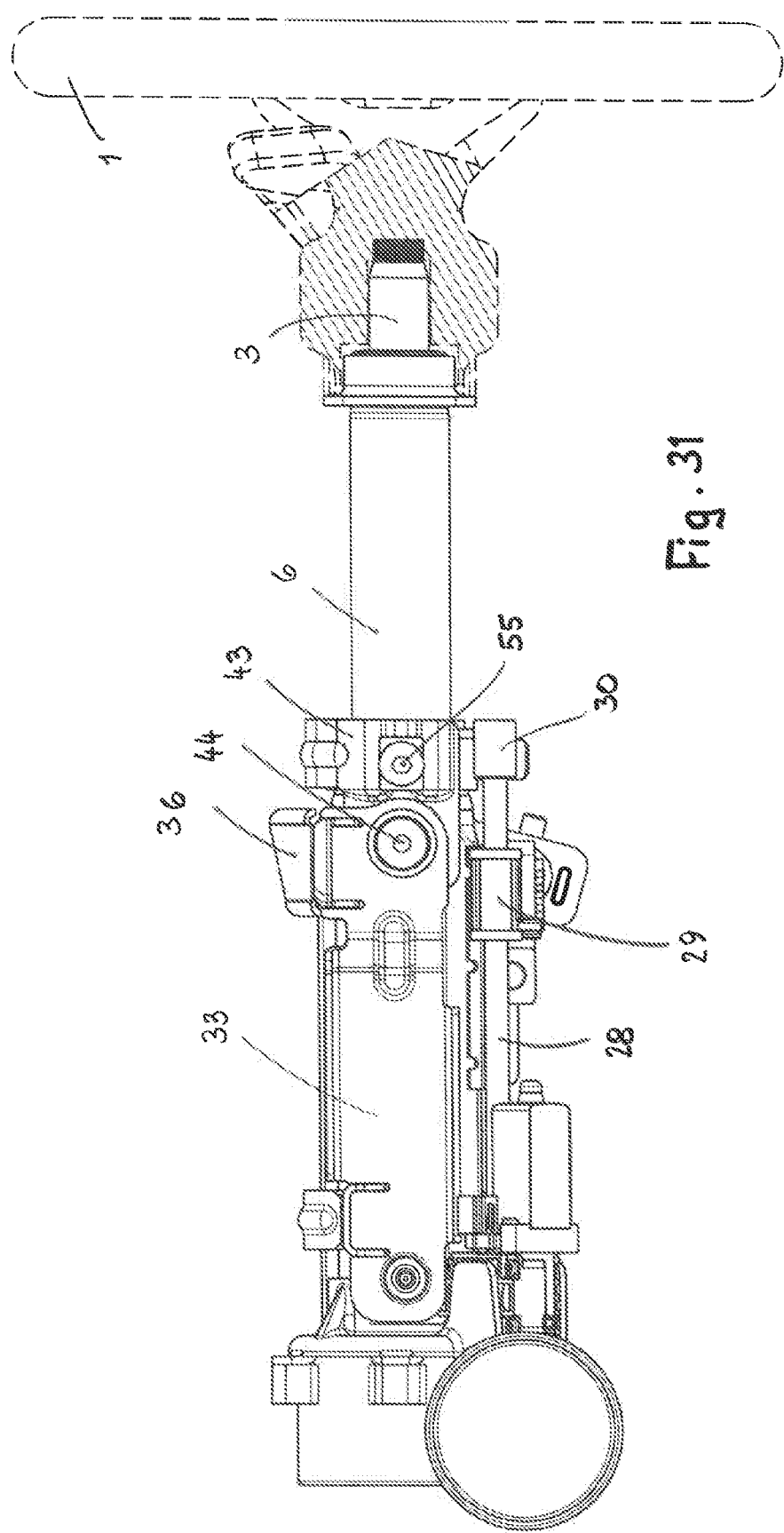
FIG. 31 is a side view of the steering wheel connected to the steering column adjustment device in the driving position.
Figure 32:
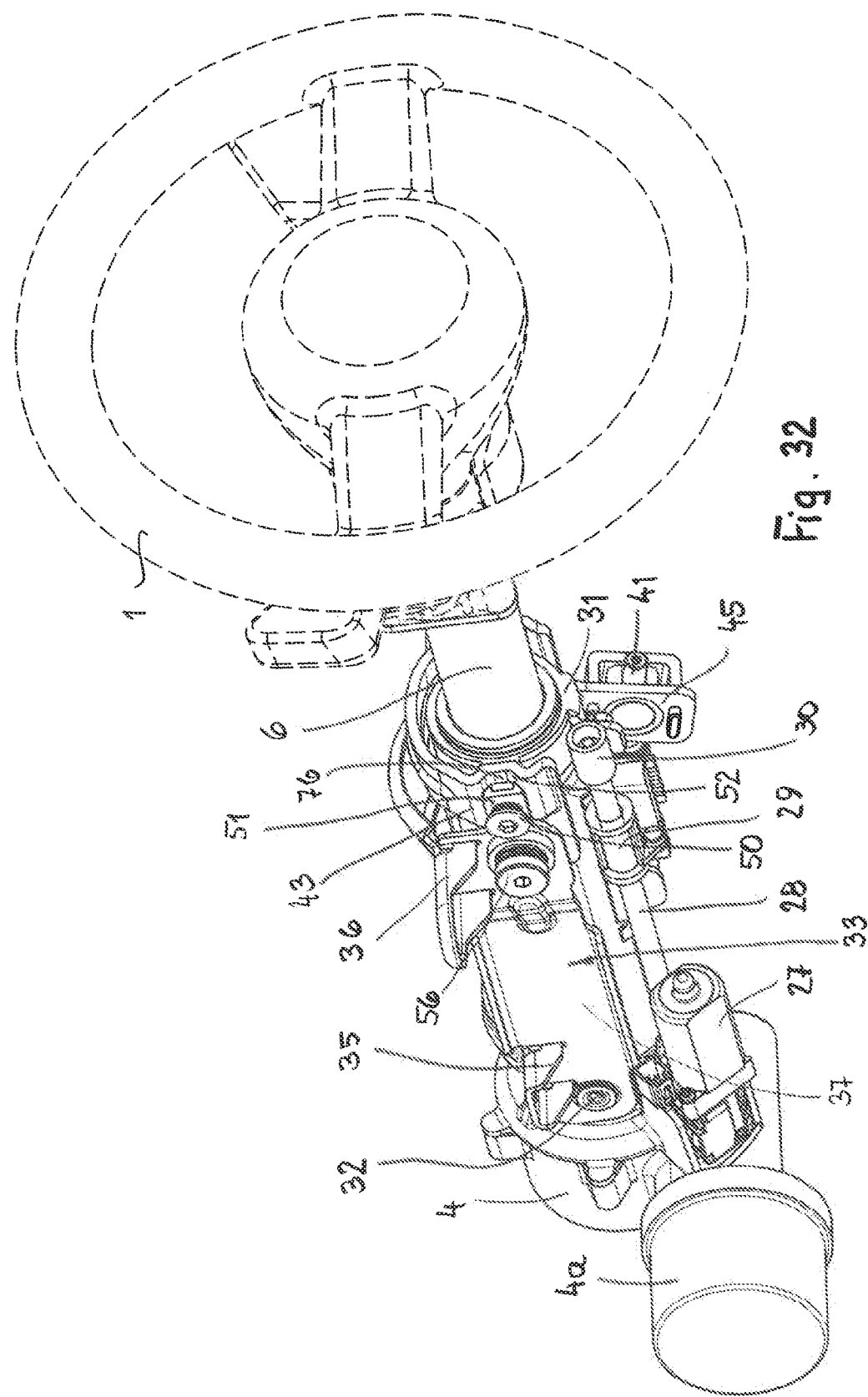
FIG. 32 and FIG. 33 are different perspective views of the steering wheel according to FIG. 31 in the driving position.
Figure 33:
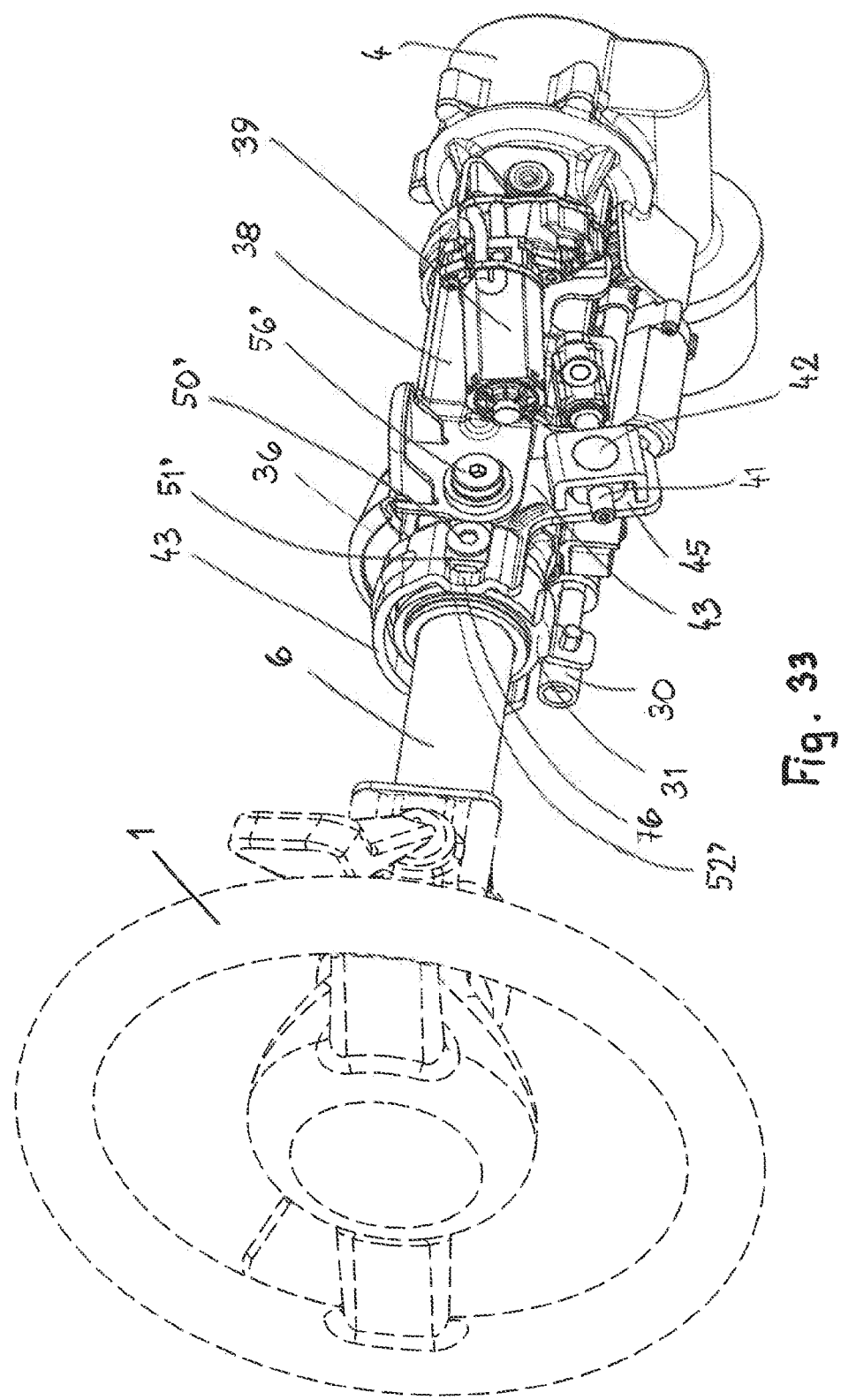

FIGS. 31 to 33 show the adjustment device in a position in which the steering element 1 assumes the driving position. In the example, it is a steering wheel that is fastened to the steering spindle 3 in a known manner.

In this position, the casing tube 6 is pulled out of the guide tube 13 to such an extent that the steering element is in the optimal position for the driver.

Figure 34:
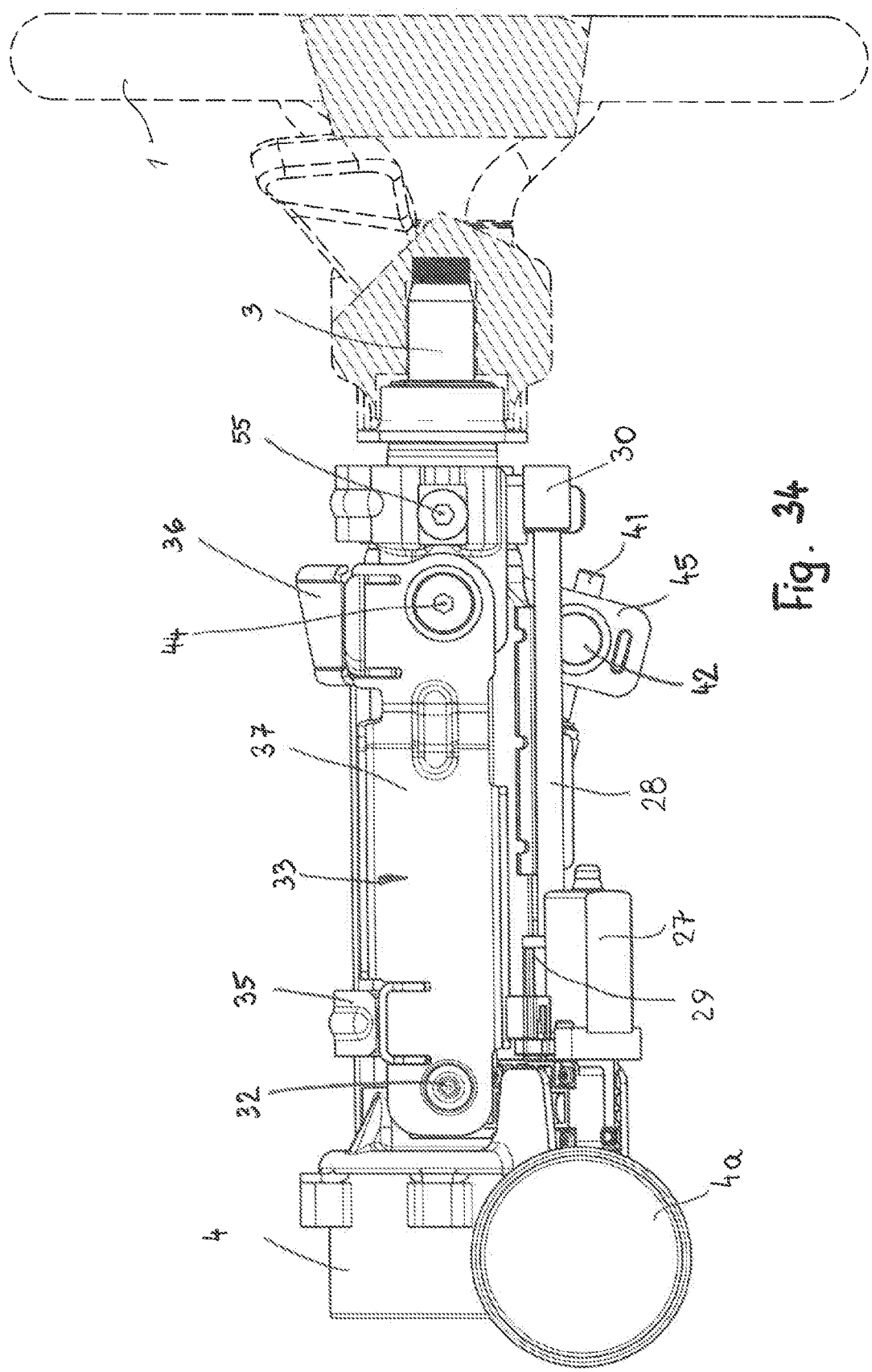
FIGS. 34 to 36 are views corresponding to FIGS. 31 to 33 of the steering wheel in the stowed position.
Figure 35:
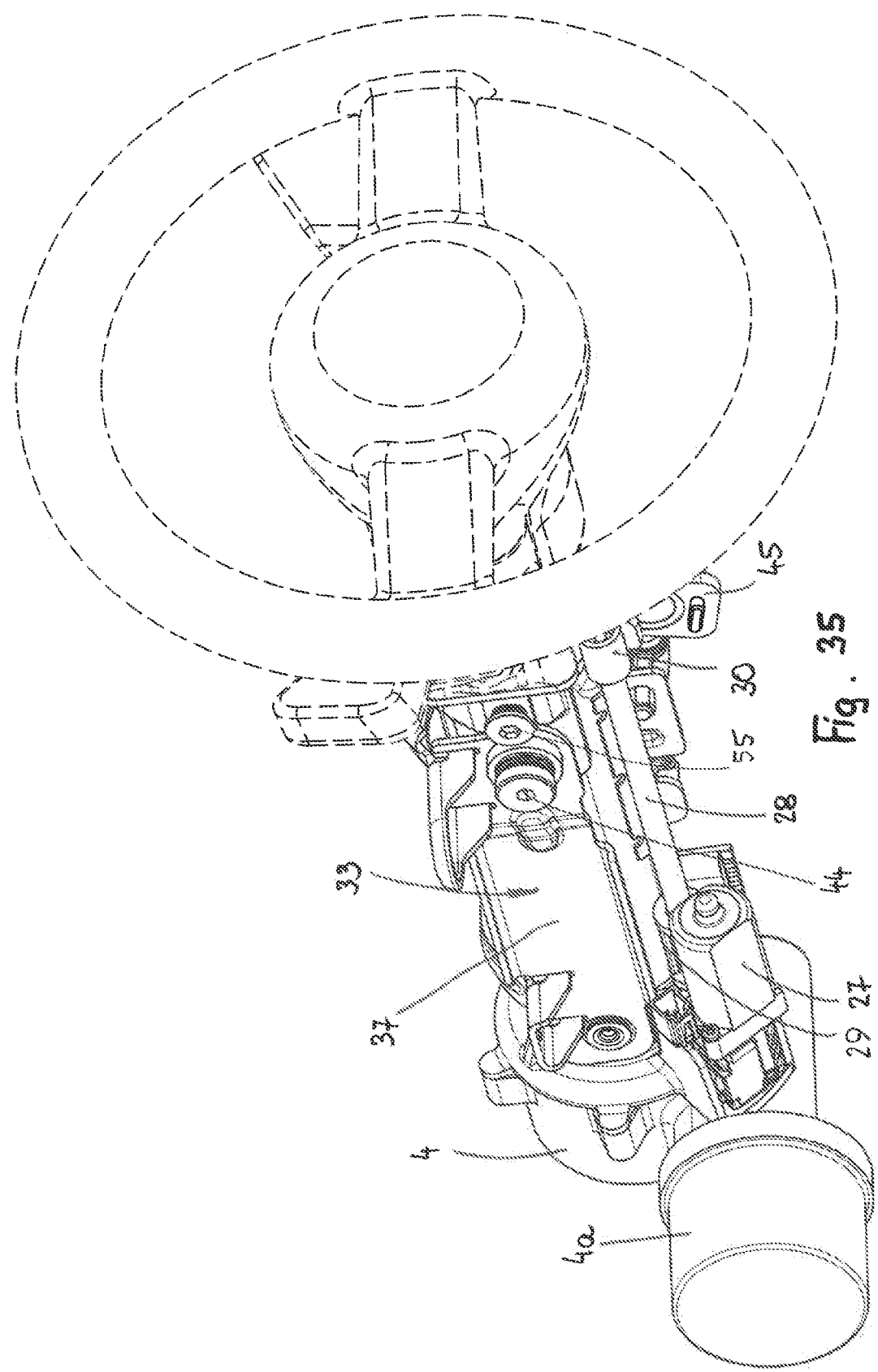
Figure 36:
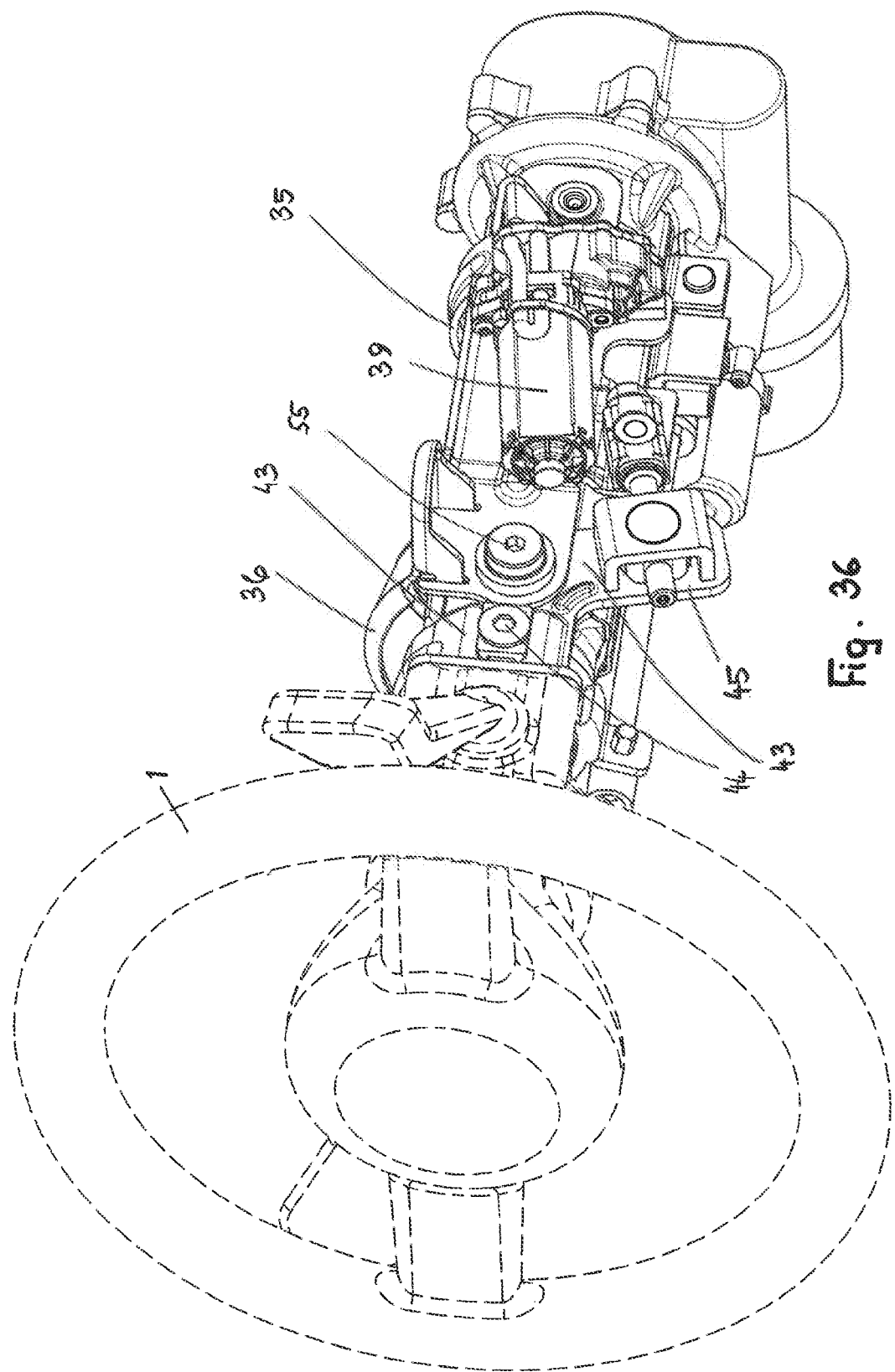
Figure 37:
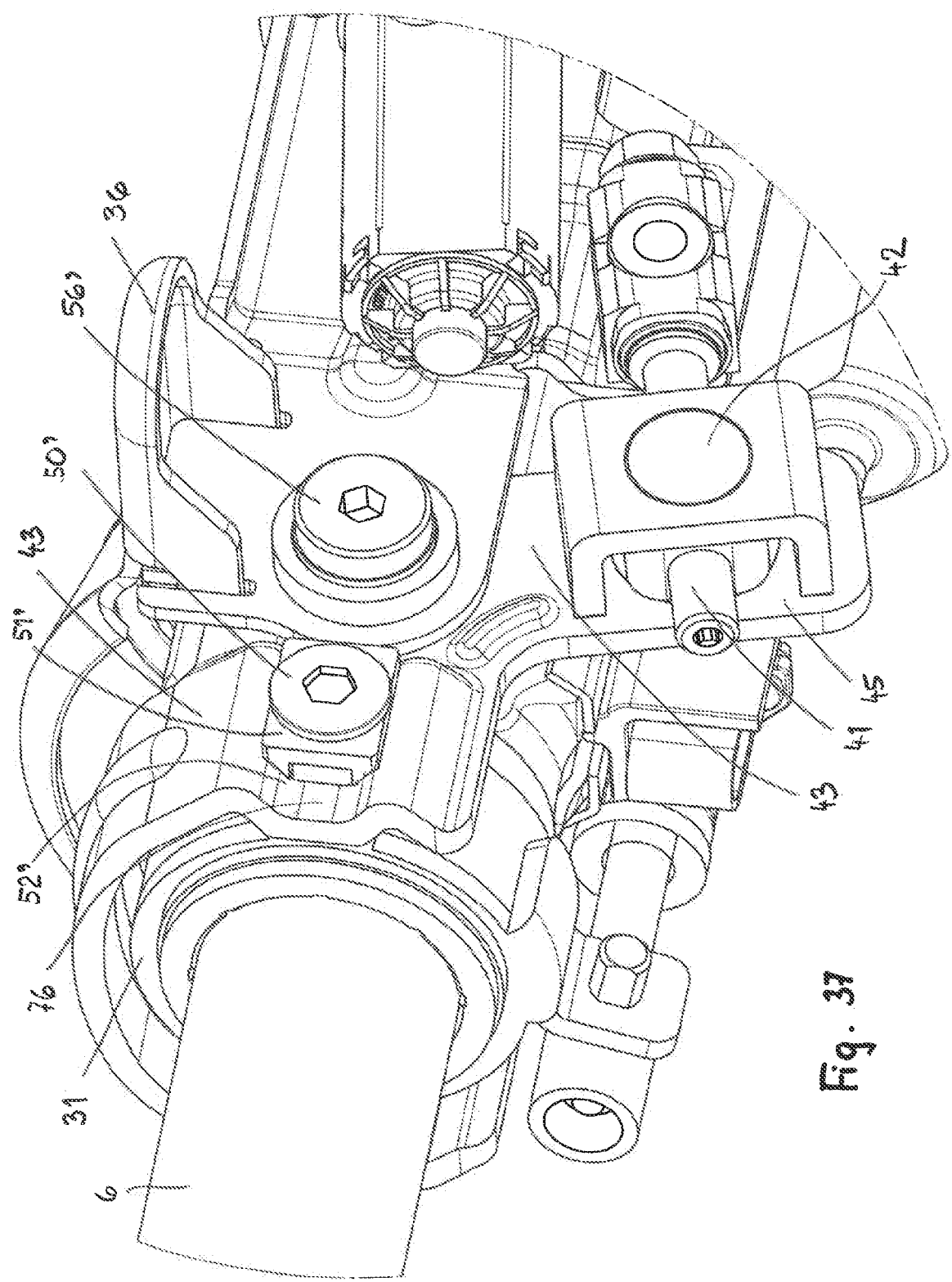
FIG. 37 is a perspective representation of an adjustment lever for the height adjustment of the steering column adjustment device.

FIGS. 34 to 36 show the adjustment device in a position in which the steering element 1 assumes its stowed position. In this position, the casing tube 6 is pushed as far as possible into the guide tube 13, so that the driver can comfortably get out of the vehicle without being hindered by the steering element.

What is claimed is:

1. An adjustment device for steering columns of vehicles, comprising:
   a length-adjustable steering shaft (2) to which a steering element (1) can be connected; and
   a drive unit (27) for length adjustment of the steering shaft (2), wherein the steering shaft (2) has a guide tube (13) which is non-displaceably connected to a holder (33), wherein an axially displaceable inner tube (6) projects into the guide tube (13), wherein the inner tube (6) is drive-connected to the drive unit (27), wherein the inner tube (6) can be connected to the steering element (1), wherein the guide tube (13) has an axially extending slot (25) through which a driver projects, and wherein the driver is firmly connected to the inner tube (6) and is drive-connected to the drive unit (27).

2. The adjustment device according to claim 1, wherein the drive unit (27) is a threaded spindle drive, and wherein a drive nut (29) is seated on a threaded spindle (28) of the threaded spindle drive.

3. The adjustment device according to claim 2, wherein the driver is firmly connected to the drive nut (29).

4. An adjustment device for steering columns of vehicles, comprising:
- a length-adjustable steering shaft (2) to which a steering element (1) can be connected; and
- a drive unit (27) for length adjustment of the steering shaft (2), wherein the steering shaft (2) has a guide tube (13) which is non-displaceably connected to a holder (33), wherein an axially displaceable inner tube (6) projects into the guide tube (13), wherein the inner tube (6) is drive-connected to the drive unit (27), wherein the inner tube (6) can be connected to the steering element (1), wherein the steering shaft (2) is connected to the holder (33) so as to be pivotable about a pivot axis (32), wherein the guide tube (13) is connected to a lifting element (31) at a distance from the pivot axis (32), and wherein an adjusting element (43) is mounted on the lifting element (31) so as to be pivotable about a further axis (55) which lies parallel to the pivot axis (32).

5. The adjustment device according to claim 4, wherein the adjusting element (39) is drive-connected to a height adjustment drive (39).

6. The adjustment device according to claim 5, wherein the adjusting element (43) has a protruding lever arm (45) extending transversely to its pivot axis (44), and wherein the height adjustment drive (39) acts on the protruding lever arm (45).

7. The adjustment device according to claim 5, wherein the height adjustment drive (39) is a threaded spindle drive, wherein a drive nut (42) is seated on the threaded spindle (41) of the threaded spindle drive, and wherein the adjusting element (43) is pivotably mounted on the drive nut (42).

8. The adjustment device according to claim 4, wherein the adjusting element (43) is mounted on the holder (33) so as to be pivotable about a pivot axis (44).

9. The adjustment device according to claim 8, wherein the pivot axis (44) of the adjusting element (43) lies parallel to the further pivot axis (55).

10. The adjustment device according to claim 4, wherein the adjusting element (43) partially surrounds the lifting element (31).

11. The adjustment device according to claim 4, wherein the adjusting element (43) has a sliding guide (52, 52'), into which a sliding piece (51, 51') assigned to the lifting element (31) engages.

12. The adjustment device according to claim 11, wherein the sliding guide (52, 52') runs perpendicular to the pivot axis (44) of the adjusting element (43).

13. The adjustment device according to claim 4, wherein the adjusting element (43) has diametrically opposed sliding guides (52, 52') into which sliding pieces (51, 51') of the lifting element (31) engage.

14. The adjustment device according to claim 4, wherein a distance between the pivot axis (14) of the adjusting element (43) and the further axis (55) of the lifting element (31) is smaller than a distance of the pivot axis (32) of the steering shaft (2) from the further axis (55) and/or from the pivot axis (44) of the adjusting element (43).

15. The adjustment device according to claim 11, wherein the sliding guide (52, 52') and the sliding piece (51, 51') allow axial compensation (62) when the steering shaft (2) is pivoted during its height adjustment.

* * * * *